United States Patent [19]
Kaplinsky

[11] Patent Number: 4,669,043
[45] Date of Patent: May 26, 1987

[54] MEMORY ACCESS CONTROLLER

[75] Inventor: Cecil H. Kaplinsky, Palo Alto, Calif.

[73] Assignee: Signetics Corporation, Sunnyvale, Calif.

[21] Appl. No.: 581,388

[22] Filed: Feb. 17, 1984

[51] Int. Cl.⁴ ............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,070,706 | 1/1978 | Scheuneman | 364/200 |
| 4,300,192 | 11/1981 | Couleur et al. | 364/200 |
| 4,410,941 | 10/1983 | Barrow et al. | 364/200 |
| 4,442,484 | 4/1984 | Childs, Jr. et al. | 364/200 |
| 4,476,526 | 10/1984 | Dodd | 364/200 |
| 4,481,573 | 11/1984 | Fukunaga et al. | 364/200 |

Primary Examiner—Eddie P. Chan
Assistant Examiner—Daniel K. Dorsey
Attorney, Agent, or Firm—Jack E. Haken; James J. Cannon, Jr.

[57] ABSTRACT

The data processing system of the invention comprises a processor, a memory access controller and a memory hierarchy. The memory access controller is placed between the processor and the memory hierarchy and controls access thereto. The memory access controller comprises a cache controller and a translation unit which are connected in parallel to an address bus connected to the processor and by which virtual addresses are transported. The memory access controller supports segments which are unit of sharing the memory, each segment is split up into pages. The memory access controller also supports regions which contain at least one segment. The memory access controller further supports sectors, divided into blocks which are other units of sharing the memory. And the memory access controller is also provided for enabling access with I/O units.

22 Claims, 32 Drawing Figures

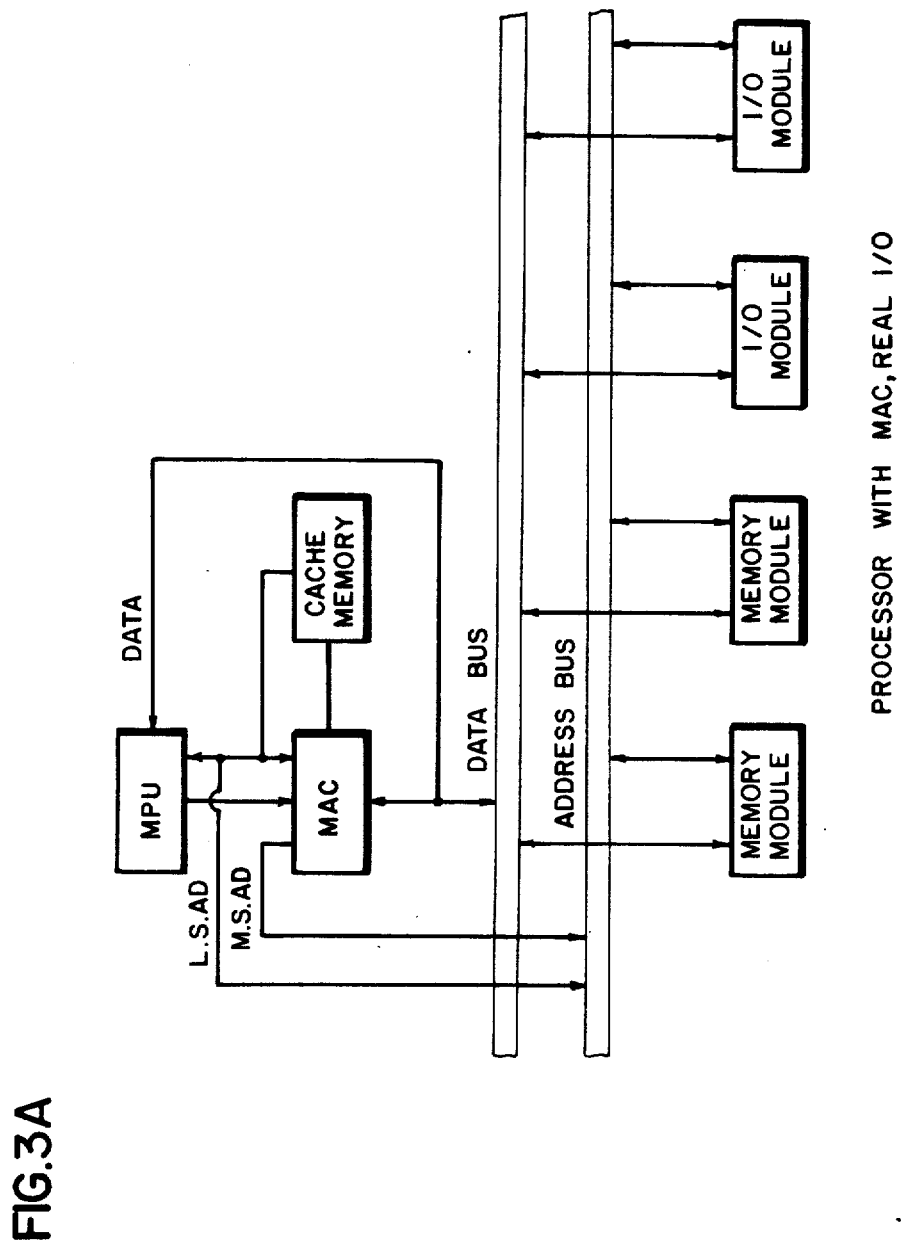

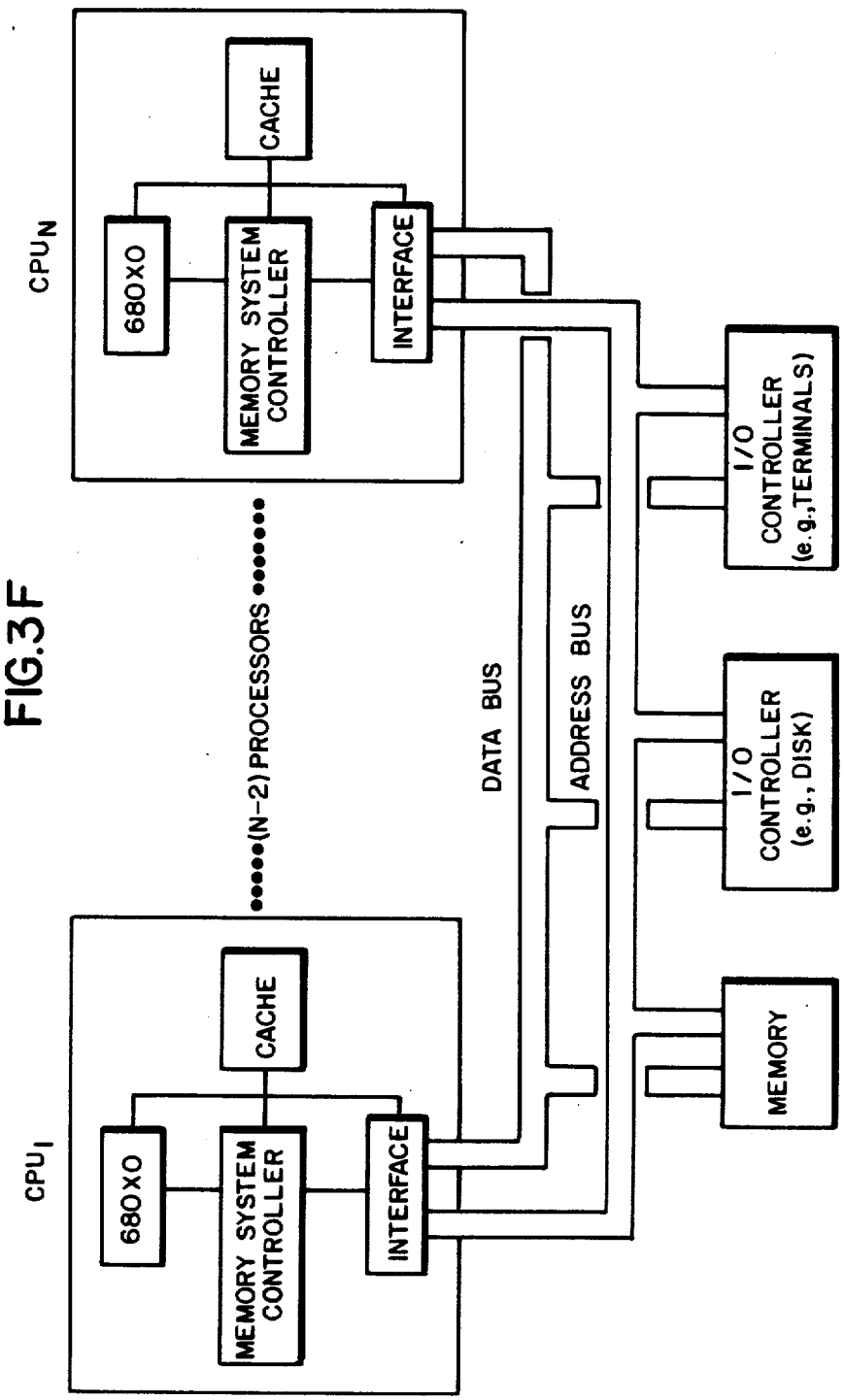

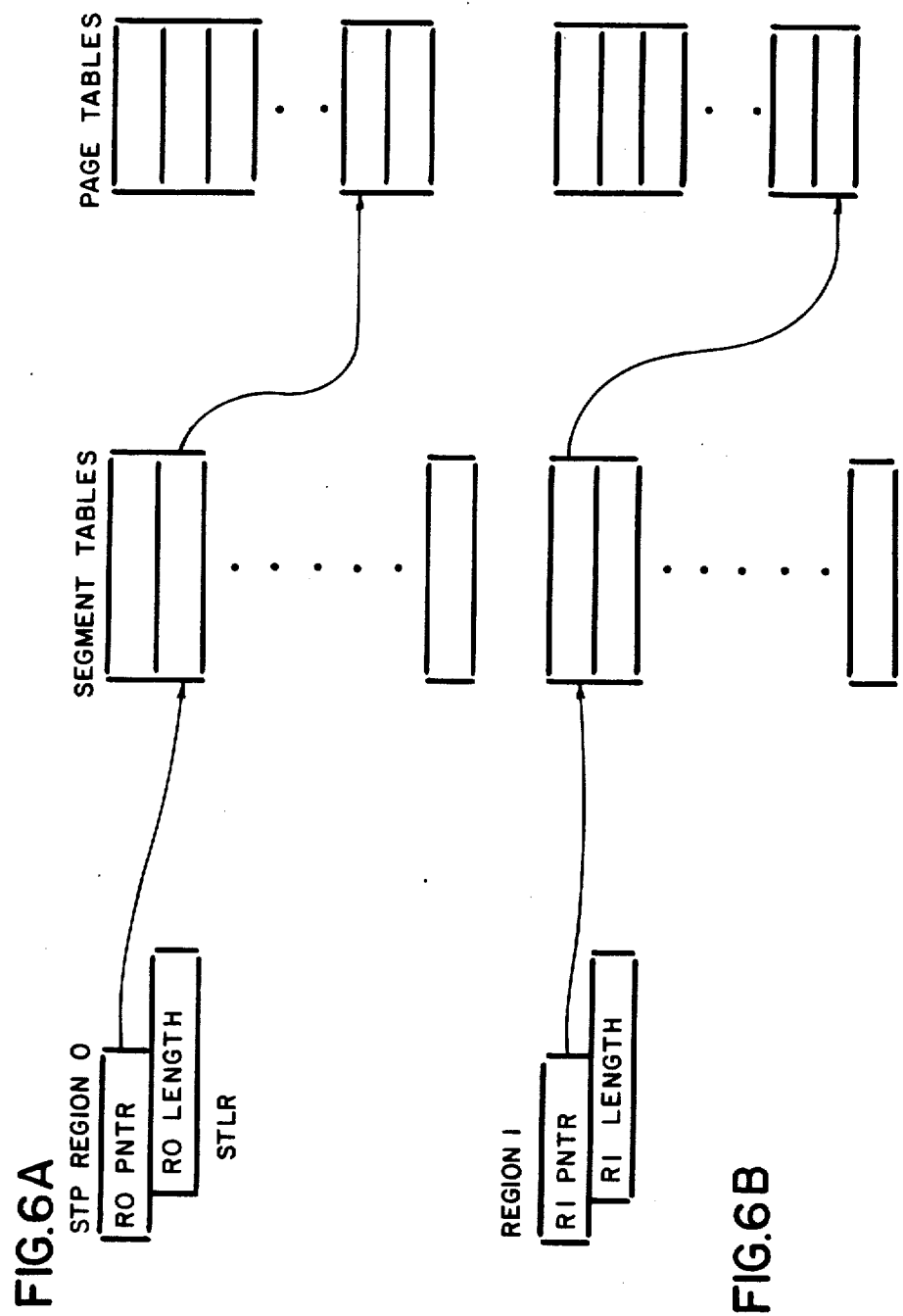

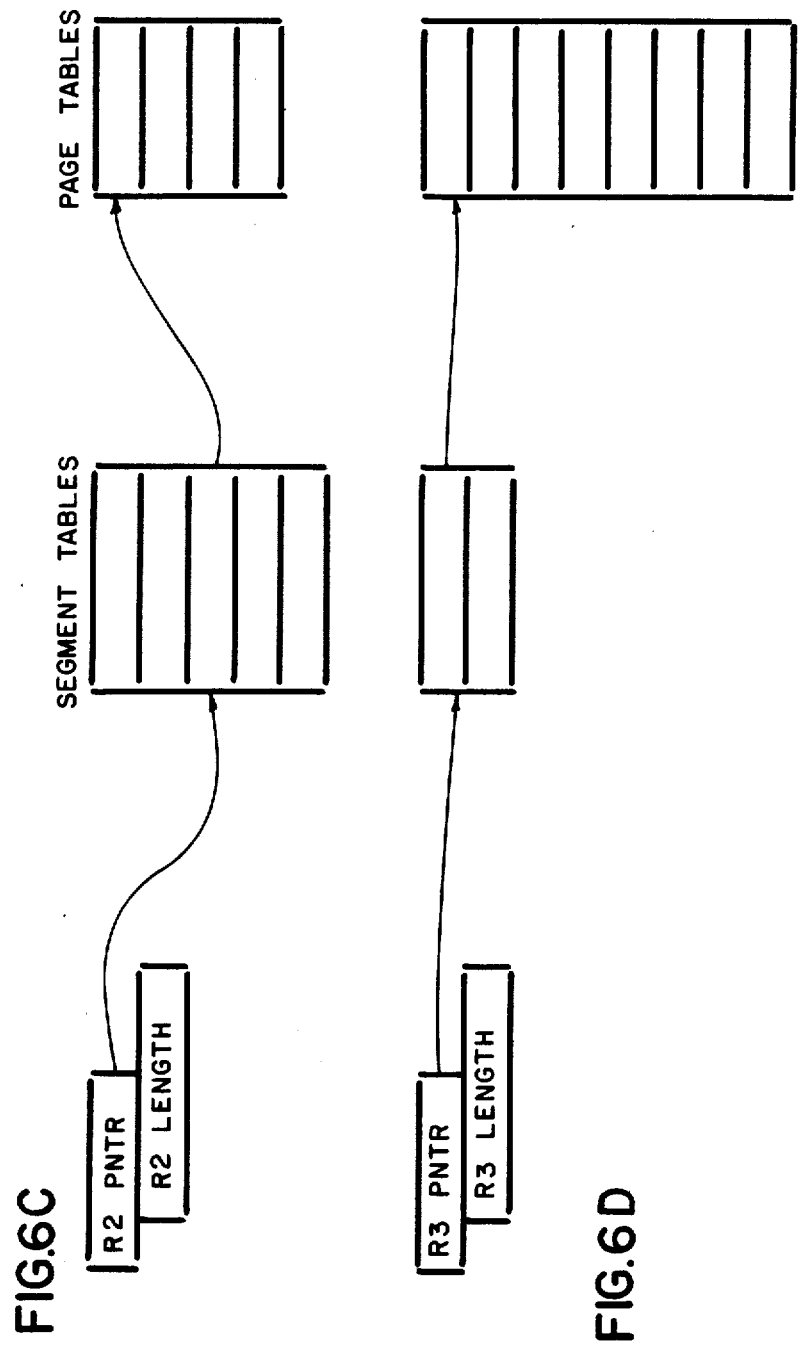

| VALID (V) | SUPERVISORY MODE ONLY (S) | EXECUTE ONLY (E) | READ ONLY (R) | WRITE ONLY (W) | NON-CACHEABLE (NC) | LOCAL MEMORY (L) | CONTINUOUS OR PAGED (C) | SET WHEN FIRST WRITTEN (D) | SET WHEN FIRST ACCESSED (U) | IDENTIFY ASSIGNED PROCESSOR (LI) | ERROR IF ACCESSED AT TOP OR BOTTOM (O) | USER-SPECIFIED (SW) | SEGMENT LENGTH (LAST PAGE NUMBER) |
|---|---|---|---|---|---|---|---|---|---|---|---|---|---|

TYPE (RESERVED)

31 ......... 21 ......... 0

BASE ADDRESS (STARTING ADDRESS OF SEGMENT)

17 ......... 0

(b)

| PRESENT MAIN MEMORY (P) | (S) | (E) | (R) | (W) | (NC) | (D) | (U) | (LI) | (SW) | PAGE FRAME ADDRESS (STARTING ADDRESS OF PAGE) |
|---|---|---|---|---|---|---|---|---|---|---|

31 ......... 21 ......... 0

(c)

| V | S | E | R | W | NC | L | C | SP | O | PAGE TABLE LENGTH (LAST PAGE NUMBER IN SEGMENT) |
|---|---|---|---|---|---|---|---|---|---|---|

PAGE TABLE POINTER (POINTER TO TABLE DEFINING THE CURRENT SEGMENT)

FIG.8A

```
BIT  31                23 22                          0
    | V |SP|C|NC|L|S|E|R|W |   PAGE TABLES LENGTH      |  (A_N)
    |              PAGE TABLE POINTER                   |  (A_N+4)
```

68920 SEGMENT DESCRIPTOR

```
BIT 15              9 8 7 6                    0
    |  PAGE TABLE LENGTH  |              |  (A_N)
    | V |SP|C|NC|L|S|E|R|W|   NOT USED   |  (A_N+2)
    |      PAGE TABLE POINTER    (L.S)   |  (A_N+4)
    |         NOT USED           P.T.P (M.S) |  (A_N+6)
```

68910 SEGMENT DESCRIPTOR

SEGMENT DESCRIPTORS FOR A PAGED SEGMENT (C=0).

FIG.8B

68920 SEGMENT DESCRIPTOR

| BIT | 31 | | | | | | | 23 | 22 | | 19 | 18 | | | 13 | 12 | | | 10 | 9 | | 4 | 3 | 0 | |
|---|---|---|---|---|---|---|---|---|---|---|---|---|---|---|---|---|---|---|---|---|---|---|---|---|---|
| | V | S | P | C | NC | L | S | E | R | W | | NOT USED | | | | SEGMENT LENGTH | | | | | | | | | $(A_N)$ |
| | BASE ADDRESS | | | | | | | | | | | | | | | | | | P | U | D | SW | | LI | $(A_{N}+4)$ |

68910 SEGMENT DESCRIPTOR

| BIT | 15 | 14 | 13 | 12 | | 10 | 9 | | 7 | 6 | 4 | 3 | 0 | |
|---|---|---|---|---|---|---|---|---|---|---|---|---|---|---|
| | X | | | | | | | | | | | | | $(A_N)$ |
| | V | S | P | C | NC | L | S | E | R | W | NOT USED | | | $(A_{N}+2)$ |
| | NOT USED | | | | | P | U | D | | SW | | | LI | $(A_{N}+4)$ |
| | X | BASE ADDRESS | | | | | | | | | | | | $(A_{N}+6)$ |

SEGMENT DESCRIPTORS FOR CONTIGUOUS SEGMENT (C=1).

FIG.9

68920 PAGE DESCRIPTOR

| BIT | 31 | | 13 | 12 | 10 | 9 | 4 | 3 | 0 | |
|---|---|---|---|---|---|---|---|---|---|---|
| | PAGE FRAME ADDRESS | | | P | U | D | SW | | LI | $(A_N)$ |

68910 PAGE DESCRIPTOR

| BIT | 15 | 14 | 13 | 12 | 10 | 9 | 4 | 3 | 0 | |
|---|---|---|---|---|---|---|---|---|---|---|
| | NOT USED | | | P | U | D | SW | | LI | $(A_N)$ |
| | X | PAGE FRAME ADDRESS | | | | | | | | $(A_{N+2})$ |

PAGE DESCRIPTOR FOR A PAGED SEGMENT.

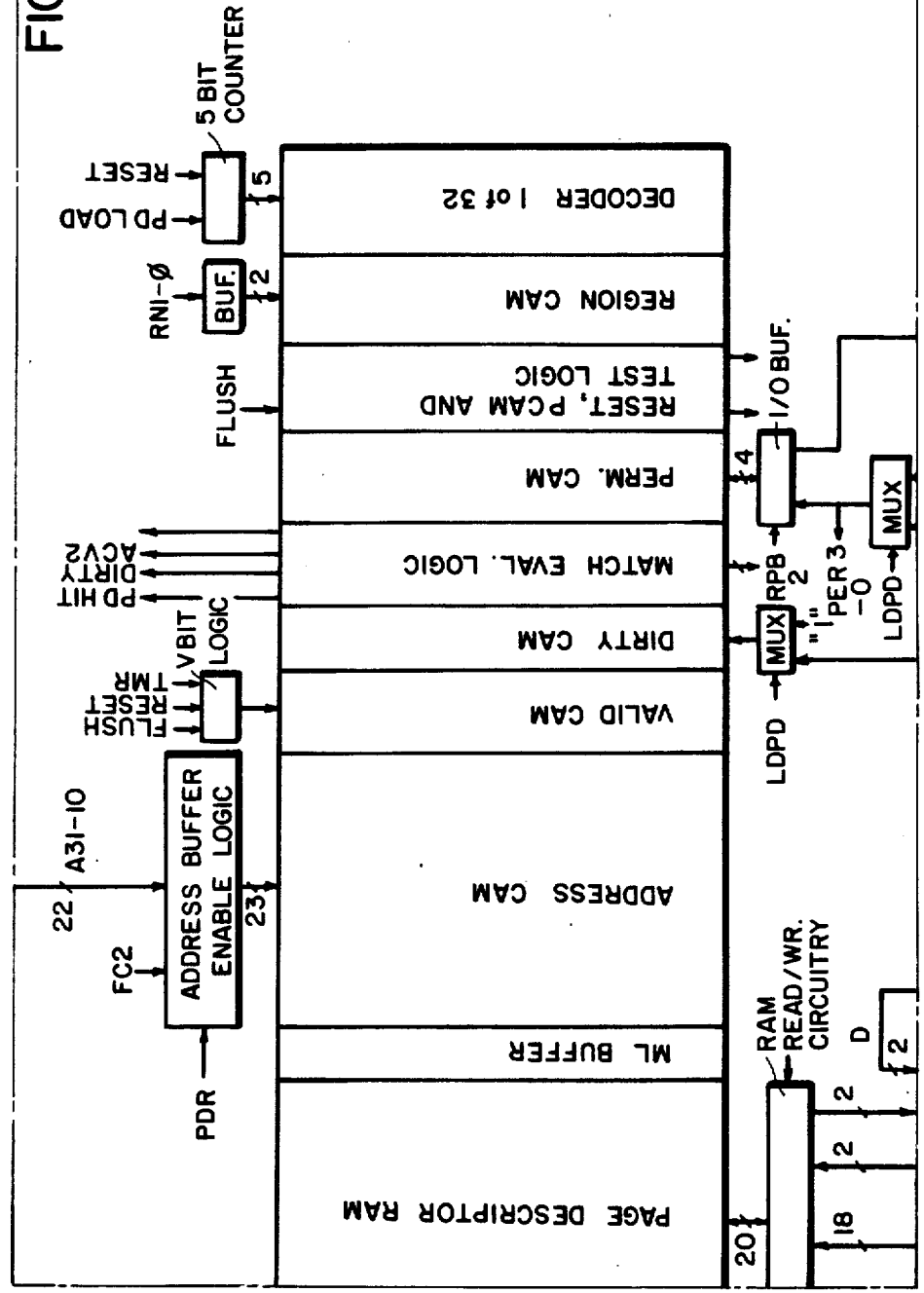

CACHE HIT TIMING

ADDRESS TRANSLATION

MEMORY ACCESS CONTROLLER

BACKGROUND OF THE INVENTION

1. Field of the Invention

This invention pertains to a memory access controller for use with microprocessors. The memory access controller (MAC) combines several functions into a single chip circuit design. It serves as a memory management unit (MMU) which controls access to memory and maps virtual addresses into real addresses. It also serves as a cache controller for speeding up access by the processor to the memory. The memory access controller combines these functions in such a way that they can be performed in parallel, resulting in a more economical and faster implementation of these functions.

2. Description of the Prior Art

Both memory management units and cache controllers are well known in the prior art. In the rapidly evolving state of the art, two such devices have received extensive publicity recently. These devices are the NS 16082 Memory Management Unit of National Semiconductor Corporation and the BELLMAC-32 Memory Management Unit of Western Electric Company.

The NS 16082 Memory Management Unit provides hardware support for demand paged virtual memory management. Its specific capabilities include fast dynamic address translation, protection on individual 512 byte pages and detailed status to assist an operating system in efficiently managing up to 16 megabytes of physical memory. High speed address translation is performed on the chip through a 32 entry associative cache which maintains itself in tables in memory with no software intervention. Protection violations and page faults are automatically detected by this memory management unit. This unit is available as a 48 pin dual-in-line package.

The BELLMAC-32 memory management unit performs address translation for both continuous segment and demand paging systems. It facilitates systematic memory organization for operating systems by partitioning virtual address space into manageable units of sections, segments and pages. It provides access protection. It further includes descriptor caches on the chip. There is a directly mapped, 32 entry segment descriptor cache and a two-way set associative, 64 entry page descriptor cache. To translate an address, the BELLMAC-32 memory management unit searchs its descriptor caches for relevant descriptors. If the descriptors are present, this unit checks for length violation and access permission violation. For continuous segments the translation is done by adding the segment base addresses from the cache segment descriptor to an offset from the virtual address to form the physical address. For paged segments this unit concatinates a page base address from the cached page descriptor to the page offset, from the virtual address, to form the physical address.

The memory access controller of the present invention is directed to a significantly improved performance level which is achieved by addressing some of the problems which exist even in the recent state of the art memory management units. By integrating a cache controller and a memory management unit in one circuit, the present invention can use virtual addresses to retrieve data from a cache memory. Additionally virtual input/output operations can be performed. The most significant improvement is the increase in system speed. By acting as a cache controller, access to data in caches is greatly enhanced. The memory access controller can relieve a bus of up to 80% of its load, thus allowing up to four processors to coexist on a bus. Multiprocessing is enhanced in other ways including the provision of a three level storage hierarchy. In short, the memory access controller allows a processor to run at full speed, provides a flexible scheme of relocating which can be extended into virtual memory, provides facilities for wide range of protection systems from trivial to the most complex and provides all the facilities to allow application programs to migrate from single processor systems to multiprocessor systems without change.

Even the 8 MHz Motorola 68010 poses problems for the system designer with regard to speed and memory management. In most real, modular systems, an 8 MHz 68010 with a 68451 MMU (Motorola) will need between two and four wait states when it accesses memory. This problem will only get worse when the higher speed 68010s and 68020s become available. This problem will be slightly reduced when the 256K DRAM is easily obtainable but it is clear that a 16 MHz 680x0 and 68451 will need at least four wait states when accessing memory unless that memory is not on a bus.

SUMMARY OF THE INVENTION

This invention pertains to a memory access controller, hereinafter called MAC, and designated the SCN68910 and SCN68920. The specific embodiments of the MAC are designed to interface to the 680X0 series of microprocessors manufactured by MOTOROLA, Inc.

The MAC is placed between the processor and the memory and controls access to the memory. Unlike a memory management unit (MMU) its functions are not restricted to relocation and protection. The MAC has two versions, the SCN68910 is in an 84 pin package which supports a 25 bit logical address space to interface with the 68010 and the SCN68920 in a 120 pin package to interface with the 68020 which has a 32 bit logical address space.

The MAC should reduce the memory access timing problem. The following table gives some indication of the advantages to be gained in a typical environment.

| n MHz 68010 with MAC and DRAMS | Equivalent 68010 with 451* and DRAMS |
|---|---|
| n = 8 | 14 |
| 10 | 19 |
| 12 | 24 |
| 16 | 29 |

*This assumes a 2 cycle 10 Mhz 451

In addition to providing this speed up, the MAC is easier to interface to than the 68451.

The MAC performs the address translation functions of an MMU. In current practice, most programs in operating systems uses a "segment" as a label for a logical extent of memory which has the same characteristics, for example code, data, etc. The MAC supports segments, the segment being the unit of sharing between processes. All segments take the same amount of logical address space but can differ in actual length. Since segments make the allocation of real memory a difficult task, each segment is split up into pages. All pages are of the same size and can be configured according to the program design.

Protection of data is done at the segment level, but history bits are kept at the page level. The history bits maintained by the device of this application are:
present in memory;
used;
dirty.
No processor intervention is needed to keep these bits current because they are automatically set by the MAC.

The MAC uses several data structures in its memory management function. The segment descriptor describes a logical extent of memory. The page table contains page descriptions which describe a physical extent of memory. The MAC has hardware support to support the memory management function. It contains a cache of 32 page descriptors on the chip itself. If an access is made to a page whose descriptor is not in the on-chip descriptor cache, then the MAC will automatically traverse the data structure to fetch the page. If the segment and page descriptors are valid and there is no fault with the permission bits, then the page descriptor is loaded into the MAC. If the used bit is not set, then the MAC will automatically set it on the first access. If a write is performed to the page and the dirty bit is not set, then the MAC will access the memory and set the bit during the first write access.

As these actions are done synchronously with the page fetching, no actions need be taken when the context is changed, that is, the MAC does not need to store any information during a context change.

If an error occurs during this process, the MAC will produce an error signal to the processor. It will first put an error descriptor in the MAC fault stack which is maintained in memory. Thus the history of multiple errors can be maintained.

The features just described allow the system to be configured with the segment and page tables in virtual memory. At least some parts of these tables have to be in real memory but the majority can be in virtual memory.

Protection is implemented using two mechanisms. The first mechanism is that a process can only access that address space for which it has valid pointers. The second mechanism is the use of the protection bits.

When a context needs to be changed, the only action that need be performed is to reload the segment table pointer (STP) and length (STL) registers on the MAC. Then all the entries in the on-chip descriptor cache are automatically marked invalid.

This mechanism, while effective, may be too restrictive in that each process will need to contain all the operating system code in its segment and page tables. Aside from being clumsy this can waste a lot of space. In order to solve this problem the address space of the processor can be divided into one to four regions by the MAC. These regions are made up of quanta of either $2^{27}$ bytes or $2^{19}$ bytes depending on the version of the MAC. Each region can be made up of between 0-31 of these quanta.

Each region has its own STP and STL registers. If either of these are loaded then only the pages in the on-chip descriptor cache that belong to that region are marked as invalid. Thus common regions for sharing or utilities or the operating system can be maintained.

Thus a process can have access to several regions. One or more of these can be private while others can be shared. This allows all the common routines to share segment tables and page tables. At least one region must have its tables in real memory.

A cache is a small fast memory, normally near to a processor, which contains the program and data currently being used. Experience has shown that if a word is used once then there is a high probability that it will be used again within a relatively short period of time. A cache provides a hardware mechanism to load the cache without being visible to the software.

In general, a cache contains a means of checking an incoming address to see whether it has the requested information. If it has its supplies it; if not, it starts a main memory access to fetch the datum. When it presents this to the processor it automatically updates its address check table and stores the data.

The MAC contains, in addition to the on-chip page descriptor cache, special hardware to enable it to control an external program and data cache. This latter cache is not on-chip but can be made up of standard static RAMs. The MAC provides all the necessary control and timing signals for the cache.

The size of the cache that a MAC can control is not fixed but can vary. The depth of the cache can be 1K, 2K or 4K blocks. Each block can be either 2, 4, 8 or 16 bytes wide. Thus the size of the cache can vary between 2k bytes and 64K bytes.

In the past a cache controller has been implemented with standard logic and RAMs. This has restricted the operations that can be performed, i.e. it was not possible to invalidate the cache in one instruction. The MAC does not suffer from this limitation and thus is able to support extra features which will be described.

The MAC cache works in the following way. The address space is divided into 32 equal sections. Thus a 31 bit address is divided in the following way:

| SECTION NO | ADDRESS WITHIN SECTION | WORD SELECTION |
|---|---|---|
| 21-24 bits | 7 bits | 0-3 bits |

The MAC controls a cache which can contain part or all of up to 32 sections or sub-caches, each of which can contain between 64 and 2K bytes depending on the depth and width of the cache.

The sub-cache address label is examined, using a CAM, to see if some of that sub-cache address space is in the cache. If the section is present, then the address within the sub-cache is used to check whether the particular block is present. If this is satisfied, then a DTACK is asserted and the cache is made to provide the data.

If the sub-cache is present but the block is not, then a memory access is started and the block is fetched. If the sub-cache is not present, then its label is inserted into the cache-controller CAM and the block is fetched. Pictorially this can be illustrated as follows:

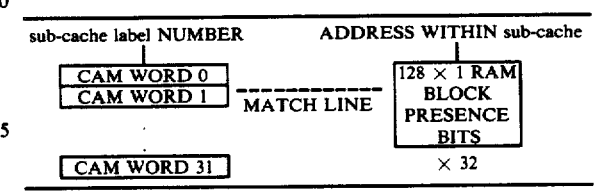

The sub-caches are marked as to which region they belong to and thus when a region's STP is changed all sub-caches belonging to that region are invalidated automatically.

The cache controller uses virtual addresses. This can be done as the cache can be instantly invalidated when a context change occurs. This occurs whenever the relevant STP register is changed.

Thus the algorithm which the MAC uses is the following. The incoming address is checked to see whether the word is in the cache. If it is, then the permission bits, which are stored within the cache controller section, are checked. Only if the access is allowed is the cache allowed to provide the data.

In parallel with this action an MMU access procedure is started. If the cache contains the requested information, then no main memory access is started. If the cache does not contain the data, or if a write operation is requested, then the physical address is output and a physical address strobe is asserted by the MAC.

If the on-chip descriptor cache does not contain the page descriptor, the MAC takes control of the bus and traverses the data path fetching the access information it needs and if necessary updating the history bits. If a fault occurs, the MAC stores the description of the fault on the fault stack and asserts a BERR* to the processor which then has to examine the stack to find the cause of the exception. If an exception occurs, then most I/O units will be able to report an abort action to the processor but cannot provide any details of the cause of the exception. No existing MMU can provide this function as they do not store the cause of a fault long enough for the CPU to accept the abort interrupt. As the MAC stores the fault information on a stack, the CPU will be able to investigate the cause of the exception and take the necessary action. The CPU can identify the fault as belonging to one of 8 control units.

The hit rate of the cache controlled by the MAC can vary between 75 and 95% depending on the characteristics of the running program and the size of the cache. Simulations have shown that this will allow up to four processors, each with its own MAC and cache, to share a common bus without interfering markedly with one another. However if more processing power were needed then the bus could become overloaded.

The MAC can control paging of information between the local memory and the main memory in the same way that it can control the paging of data between the main memory and the disk. Thus the processor and MAC together support a hierarchy of five levels of memory i.e.
1. Registers
2. Cache
3. Local Memory
4. Main Memory
5. Disk The MAC contains special provisions to allow this paging to be done.

If a local memory is used and used intelligently i.e. for local and stack data, then up to 10 processors can co-exist on the same bus. This use of memory is easy as the segment merely has to be marked so that it is stored in local memory. Thus with minor changes to the page turning routine, local memory can be incorporated invisibly to application programs or even the rest of the operating system.

If optimum performance is required then it would be useful to modify the process dispatching algorithm slightly so as to try and dispatch a process on the processor on which it previously ran. Typically this would involve the processor that needs to be dispatched starting at a certain point in the dispatch queue. This can be done as the MAC contains space for a processor identification register.

A problem can arise in a system with multiple processors, each with its own cache, concerning which has a true copy of the data i.e. if two caches each contain the contents of the same word of memory then and one processor alters that word, how is this communicated to the other cache.

The MAC provides a write-through policy, i.e. each time something is written it is written into the cache and the relevant, local or main, memory. If this address were broadcast, as is common in mainframes, then the cache controller would typically spend most of its time looking at the broadcast addresses and would not have any time available to service its processor.

If one examines how two, or more, processes or processors share information, then it is clear that they always use some sort of signalling mechanism. This signalling mechanism may be implicit or explicit.

Implicit signalling is normally performed at a very gross level i.e. between a process and an I/O control unit. The handshake is a start I/O from the processor to the channel or control unit and an interrupt from the latter when it is finished. The process inhibits itself from looking at the data until a completion interrupt arrives as it does not know how consistent the data is.

When the interrupt arrives the process will need to be re-dispatched. When this happens the STP register will be loaded with the new value. The MAC will then automatically invalidate the contents of the cache and thus stale data cannot be read by mistake. The reason that this is possible for the MAC and was not possible before is due to the level of integration of the MAC. The CAM containing the section information and its associated RAM can instantly be invalidated; this was not possible using dicrete implementation.

Explicit signalling is done very seldom by processes except deep within the operating system or in real time situations. In this case a semaphore, or similar signal, is used to ensure that the data is not being read while it is being written. In these cases the MAC offers two solutions.

The first solution is to place the, normally small, amount of data in a non-cacheable segment. In this case the MAC will never cache the data but will cache its page descriptor in the descriptor cache.

A second solution to this problem is to change the test semaphore function, normally a call to an Operating System routine, so that it will automatically flush the cache by reloading the STP.

In both cases the programmer has already realized that the processes need to be explicity synchronized. The only difference that the MAC makes is to slightly alter this synchronization method or to change the segment (load) attributes. The MAC can speed up a systems performance in the following ways:

1. Providing a cache allowing the processor to work without any wait states for up to 95% of the time.
2. By providing "Software in Silicon" i.e. the MAC has the ability to fetch the descriptor it needs and do the necessary checks. It can do this faster than was previously possible for the processor to do it as it contains special hardware. In addition the processor does not waste time taking an exception.

3. Context changing can be quick as none of the previous context need be stored.
4. If enough performance cannot be achieved with one processor then up to 10 can be used with no changes to most of the software.

BRIEF DESCRIPTION OF THE DRAWINGS

FIGS. 3A to 3G are block diagrams showing the memory access controller of the present invention in various system configurations.

FIGS. 6A and 6B illustrate the table structure.

FIGS. 8A and 8B illustrate segment descriptors.

FIG. 9 shows a typical page descriptor.

FIGS. 10A to 10F are detailed circuit diagrams of the memory access controller of the present invention.

DESCRIPTION OF THE PREFERRED EMBODIMENT

The following description assumes knowledge of the Motorola 68000 microprocessor family and related chips.

Figure 1:
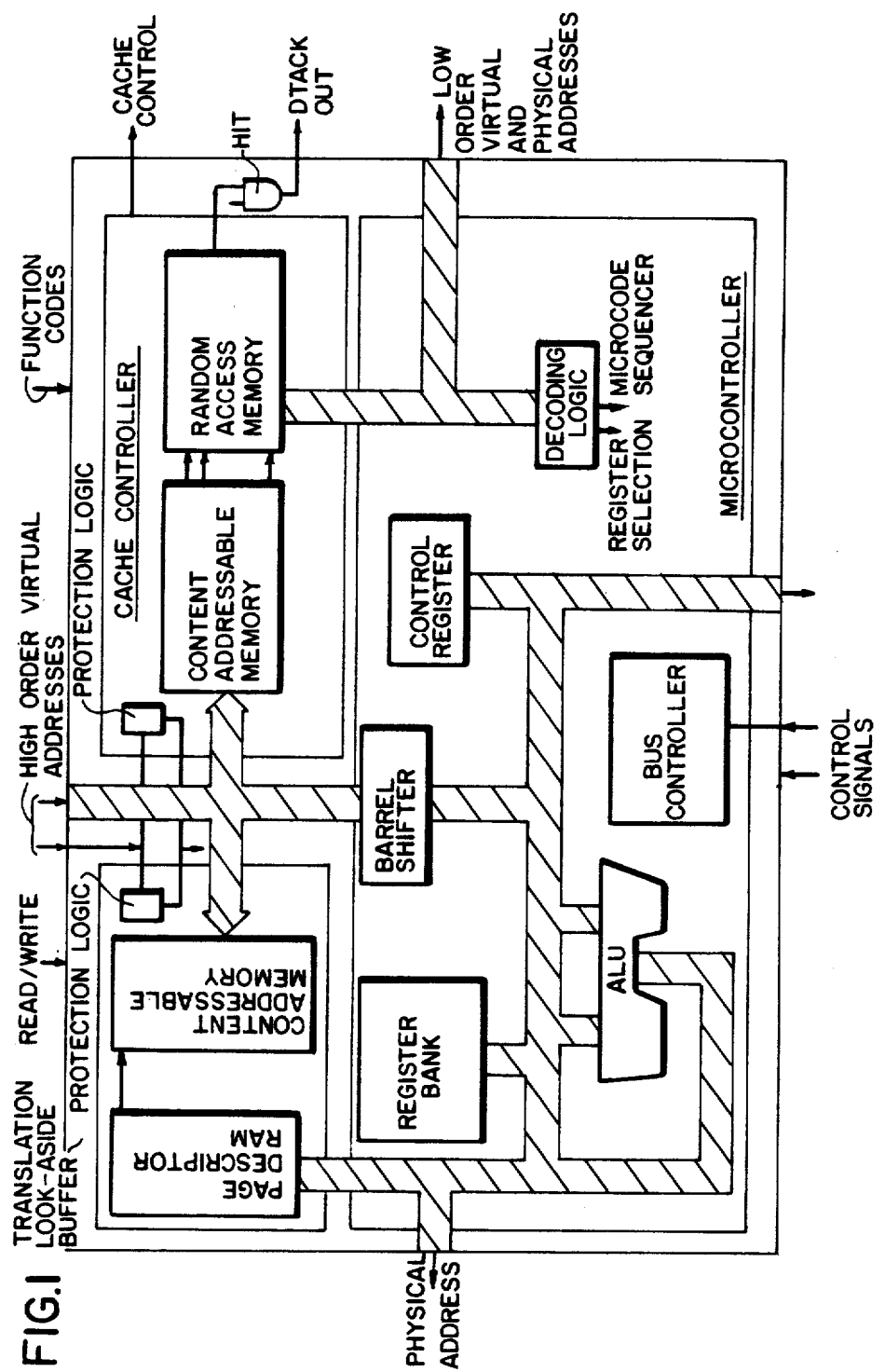
FIG. 1 is a block diagram showing the architecture of the memory access controller of the present invention.
Figure 2:
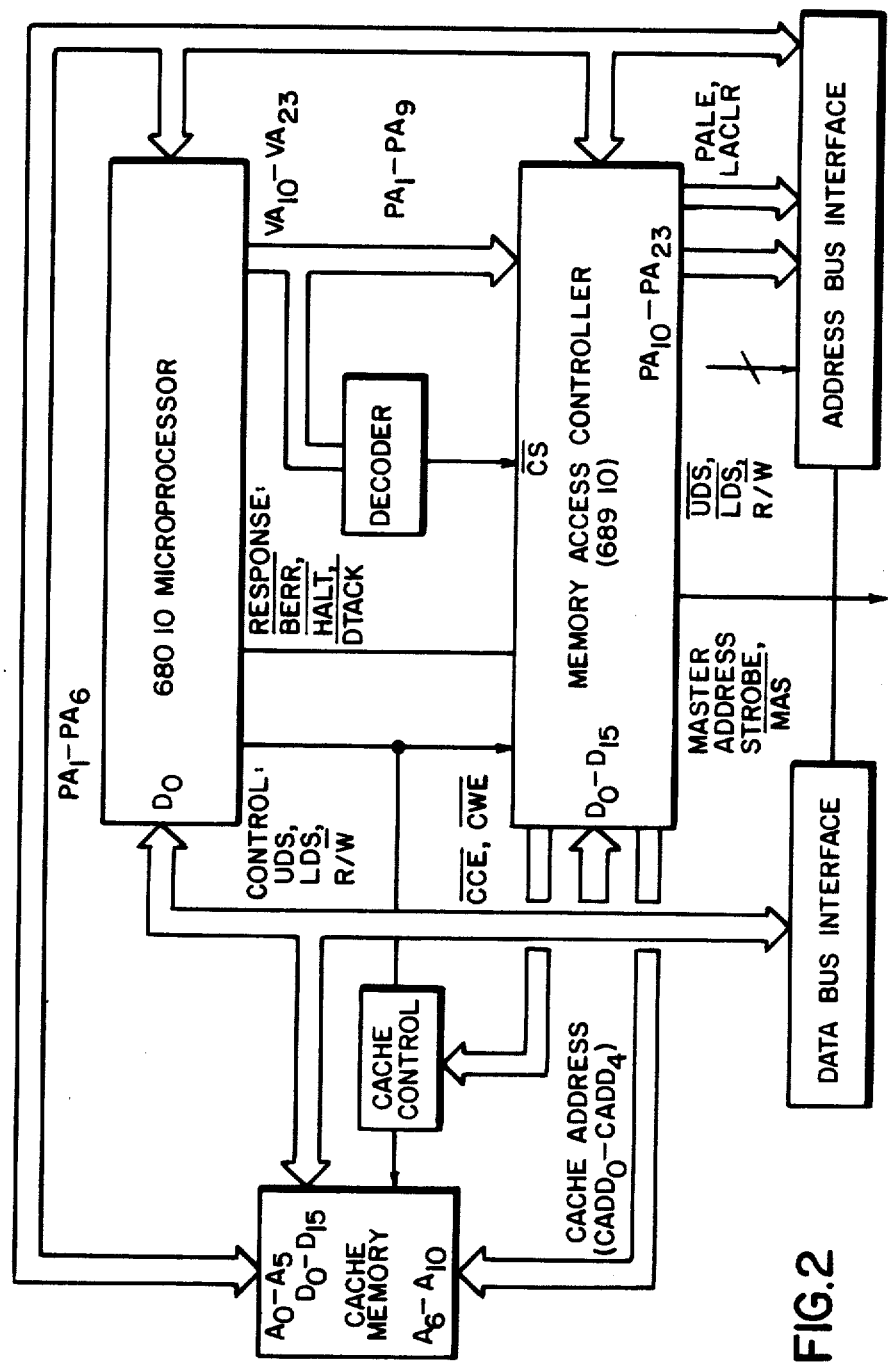
FIG. 2 is an interface signal diagram for one embodiment of the memory access controller of FIG. 1.

FIG. 1 is a block diagram showing the architecture of the memory access controller of the present invention. FIGS. 3A through 3F illustrate the functional arrangement of the memory access controller in various configurations of the 68000 family with associated memory devices. The invention is not restricted to 68000 family systems.

FUNCTIONS PROVIDED BY MAC

The Memory Access Controller (MAC) controls access to multiple memories in a microcomputer system, as shown in FIGS. 3A to 3F inclusive. In doing so, the MAC performs the functions normally done by both a cache controller and a memory management unit. It performs the following basic functions:
1. access control of the memory hierarchy;
2. translation of virtual to real addresses;
3. support for context changes;
4. help with the history of bookkeeping;
5. protection against unauthorized access by processes to the memory.

The operating system is responsible for allocating these access rights and mappings, e.g. to allocate the system memory; and the MAC implements these functions dynamically. The memory hierarchy can consist of three immediate access store elements, a cache, a local memory and the system memory, as shown in FIGS. 3A to 3F.

CACHE

This memory element contains a copy of scattered sections of the lower two members of the hierarchy. It is completely controlled by the MAC and is transparent to the software. The cache is a small, fast memory that allows the processor to see the cache access time instead of the usual system memory access time for approximately 90% of its accesses and reduces the bus usage by approximately 85%.

LOCAL MEMORY

Local memories can be attached to each processor in a multi-processor system. The MAC provides facilities to control the movement of code and data in and out of these local memories. This feature is transparent to the user software.

SYSTEM MEMORY

This is the main memory accessible to all parts of the system.

A demand paged virtual memory system can be implemented with one or more MACs. The MAC makes a multiprocessor system practical by reducing bus utilization as a MAC can be attached to each processor (FIGS. 3C and 3D. The MAC has a special provision to allow multiple processes or processors to operate even if they share common data. If an 85% reduction in bus usage is not sufficient, then a local memory can be attached to each processor which will reduce it further (FIG. 3D).

The MAC provides facilities for allowing DMA units to use either real or virtual addresses. In the latter case all control units which use virtual addresses must be connected to a MAC.

Thus the MAC provides all the necessary memory access and control to allow true demand paged virtual memory systems to be built.

MEMORY STRUCTURE

The MAC uses a memory which is divided into variable length segments, which in turn are divided into fixed length pages. As any segment can be any number of pages in length, the system can work if desired with only two segments—program and data. The upper limit of pages is 4M per user for systems that use the SC68020 processor. Protection is provided on a segment basis. Segments can have the following protection attributes:
1. Supervisor permission needed (S)
2. Read permission (R)
3. Write permission (W)
4. Execute permission (E)

These attributes are recognized and protected dynamically by the hardware. If a user attempts to access a segment for which he has no permission, a bus error (BERR) signal is generated.

If a very sophisticated protection scheme is needed, this can easily be accomplished without any appreciable performance loss using simple software. Each segment has associated with it a software protection (SP) bit. If the software protected bit is set, the BERR will be asserted with the segment is first executed. Thus it is simple to add a domain field to a segment descriptor to ensure that certain subroutines can only be called through access gates which provide additional access permission checks. Alternatively, the entries in a process's segment table can be used to restrict its address space to those entities for which it legitimately needs access. This is discussed further later.

Aside from these protection attributes, the MAC supports three additional attributes which are used to control the memory hierarchy. These attributes are:

NON-CACHEABLE (NC)

This attribute forces associated segments to never be cached. It forces segments which are shared between processes to have only one copy which is always up to date.

LOCAL (L)

If the system has local memory then this attribute is used to force the associated page into the memory local to the processor and save bus accesses.

CONTIGUOUS (C)

This attribute if set indicates a segment that has no page table associated with it. Such segments are to be loaded and relocated in memory as a whole.

CACHES

A cache contains a copy of portions of program and data which are in the memory. Its associated principle works because most words of memory are accessed more than once within a relatively short time interval. The MAC automatically stores each word read by the processor in the cache and, if the processor tries to read that word a second time, the MAC provides the word from the cache instead of accessing the memory. When the processor writes a word, the MAC implements a write through policy i.e. the word is written into both the cache and the memory. If a segment is marked as local, then this refers to the local memory and not the system memory. If the bus is not available to the processor, the MAC allows the processor to proceed, and if the bus is granted before the next "cache miss" or before the next write, the processor need not be aware that there was a bus access latency time.

Under some conditions, i.e. when two processors are sharing access to a common segment of memory interleaved in time, it may not be desirable to cache the data. Segments can be marked as non-cacheable.

CACHE TYPES

Although many types of cache implementations can be thought of, there are three main types which are briefly discussed. These are:

TAGGED CACHES

These are the "normal" caches as used in many mini and mid range computers. Associated with each cached item is a tag identifying the upper address bits. These tag bits are compared against the high order address bits of the word being sought. If they match and a presence bit is set, then a "hit" is recorded.

The advantage of this type of organization is that it can be made with standard MSI and LSI parts, and thus has allowed computer companies to implement caches even though the semiconductor industry has not supplied any special ICs.

There are two disadvantages of this system. The first is that it is relatively RAM intensive in that tags have to be stored with every word. The second disadvantage is that the set size is restricted due to the width, as opposed to depth, of RAM and the number of comparators needed. (Set size can be loosely defined as the number of candidate places in the cache for any word).

ASSOCIATIVE CACHES

Associative caches are similar to tagged caches in that they have an identifier attached to each cache word. They differ from tagged caches in that the identifier is a content addressable memory (CAM) which holds the high order bits of the address.

The advantage of this system is that the set size is the size of the cache. The disadvantage is that it needs a high overhead, as the cost of the CAMs is greater than the cost of the RAM storage to hold the data. In addition this method has not been practical as the semiconductor industry has not supplied any reasonably sized CAM ICs.

SEMI-ASSOCIATIVE CACHES

Semi-associative caches are an attempt to temper the idea of an associative cache with a dose of reality. Basically a semi-associative cache adds one assumption to the idea of associative caches. The assumption is that there is a working set of memory locations which in fact is reasonably small and tends to cluster, on a medium time grain, around some points.

In a semi-associative cache the cache itself is divided into a number of sub-caches. This number is called the set size. These sub-caches are defined by the high order address bits as shown by the following example:

Take an address n bits in length. This is divided into three areas:

L bits the label high order address bits which define the sub-cache

I bits the index this is used to access the sub-cache (the algorithm will be given later)

B bits the offset this is used only if the block size is greater than the word size. The block size is the width of the data path between the cache memory and the memory. It can be wider than the processor's data bus.

In other words an address looks like:

| label (L bits) | index (I bits) | offset (B bits) |
|---|---|---|

The label field defines a sub-address space of $2(I+B)$ words in length. Up to S, the set size, of these address spaces can be mapped into the S subdivisions of the cache simultaneously. Note that the mapping between one of these sub address spaces and a sub-cache is not fixed but varies dynamically.

Thus the first step in checking if a particular word is in the cache is to see if its sub-address space has been mapped into a sub-cache. If this is the case, then the next step is to see if the particular word is present. Thus a presence bit per word is needed. When a word is read into the cache for the first time the presence bit is set. When the word is accessed subsequently, the cache controller checks to see if the sub-address space has been mapped into a sub-cache and that the presence bit is set. If both are affirmative, the word is accessed out of the cache. Note that the path to memory can be wider than the path to the processor. In this case a block, which is the width of the path to memory, is the unit of access. The presence bit represents a block not a word. In this case, the B offset bits are not used in the cache controller but are used externally to select the word from the block.

The basic algorithm to see if a word is present in the cache is:

1. Compare the label field against a CAM of length S and width L. If there is a match go on. If not, a miss has been recorded. To to step 3.

2. Each sub-cache has a $2^I \times 1$ RAM associated with it in order to see if the desired block (word) is present, i.e. each block has a presence bit associated with it. Use the index to access this RAM. If the presence bit is set then the required data is present and the B offset bits can be used to access it. If the presence bit is not set, then cause a memory access and load the data into the cache setting the relevant RAM bit.

3. This step is taken only if the address space denoted by the label has no sub-cache allocated to it. Therefore a sub-cache needs to be allocated. The oldest allocated sub-cache is freed, i.e. a label sub-space is de-allocated and the needed label is allocated to the sub-cache. All the presence bits of the sub-cache are reset to zero and step 2 is now taken. In this case a new mapping has to be made between the sub-caches and the addresses. Note that steps 1 and 2 can be taken in parallel, with the output of step 1 being used to validate the output of step 2.

Note that this replacement algorithm is essentially a FIFO mechanism. Simulations have shown that, with a working set the size of the MAC's, there is no real performance difference between a FIFO and a LRU replacement algorithm.

VIRTUAL MEMORY

Overview

The view of virtual memory presented here is fully supported by hardware. It may well appear to be too complex for simple implementations, or not complex enough for high security systems. In the former case the system can be simplified trivially which is explained later. In the latter case the hardware protection can be extended by software to increase the degree, subtlety or range of the protection mechanisms. These software extensions are protected by hardware so that they cannot be circumvented.

A virtual address can be split into three portions:
(1) segment number
(2) page number
(3) offset within a page This split is supported by hardware. The split between (1) and (2) is a convention of the software established at SYSGEN time, and the MAC can be programmed accordingly. The choice of the split between (2) and (3) is more restricted and is also handled by the MAC.

Partitioning of the Address Space

Figure 4:
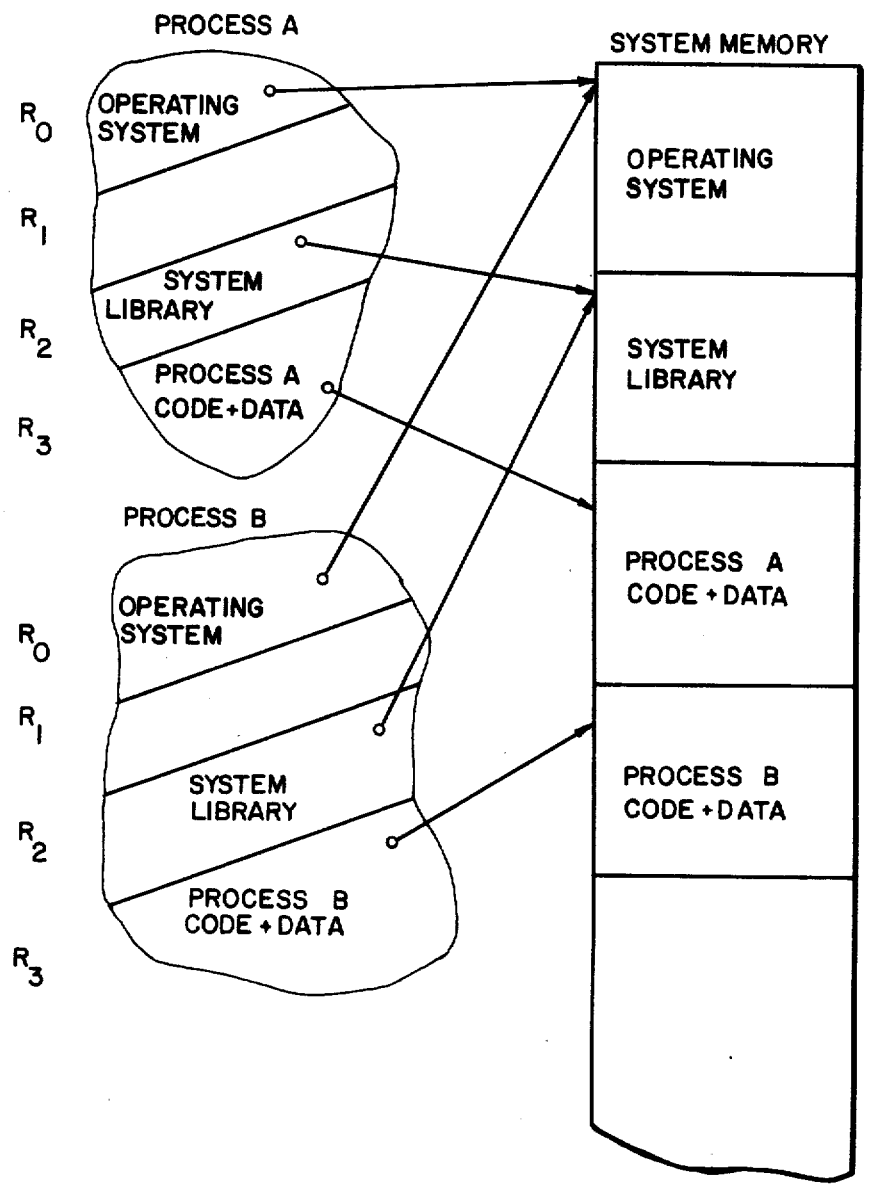
FIG. 4 is a diagrammatic illustration of a partioning of virtual memory space into regions.

The Virtual Address Space as seen by the processor and the software can be partitioned into up to four different regions, each of which has its own segment table. This partitioning need not occur, i.e. the address space can be left as one region. These regions which are configured by software are provided so that a protected, fast operating system can be made. This partitioning is illustrated in FIG. 4.

Virtual Address Space Regions

The four regions are defined sequentially starting from the bottom end of the virtual address space. The upper limit of each region is specified in turn. This implicitly defines the lower limit of the next region. Thus if only one region is to be specified, then its upper limit is given as FFFFFFFF. The four regions are all equivalent.

Note that the virtual address space can be defined by the address only. The function codes are then used for protection. The Motorola concept of address spaces in the 68451 is replaced here by the concepts of the regions. The latter are used in a similar but less restricted fashion than the former to enable different processes each to have its own unique virtual address space. Naturally portions of this address space can be shared with other processes. Sharing is discussed later.

Optionally the address space can be split into two address spaces. This allows a virtual operating system to be built.

Each region has its own segment table defined implicitly by the Segment Table Pointers (STPs) and Segment Table Length Registers (STLRs) as shown in FIGS. 6A, 6B. The segment table defines which areas of the virtual address space are accessible to the current process. The definition of a current region is achieved by re-setting these registers on the MAC. This can only be done in the privileged mode. If a reference is made to a region whose enable bit is reset, an BERR is generated.

Region definition and enabling is done via a set of dedicated registers. These registers are defined and some programming considerations are discussed later.

Use of the Regions in a Simple System

A simple system is defined as having only one region which is accessible by all function codes. Thus protection is performed by the protection bits associated with each segment. This system is configured by writing FFFFFFFF into all Region Definition Registers, thus defining the upper boundary of R0 to be FFFFFFFF and the lower boundary of R0 to be 00000000.

Nothing further has to be done. The system can be used as if it had only one region which stretches uniformly from 0 to FFFFFFFF.

Full Use of the Regions

This section gives an example of how all four regions can be used in the implementation of an efficient operating system which protects users from one another and from itself, and is illustrated in FIG. 4.

Region R0 is used only by the privileged part of the operating system and contains the part of the kernel which is privileged. Thus, all segments in this region are marked with an indication that supervisor permission is needed to access them. This part of the operating system should be as small as possible, as it has access to all of memory.

The next region, R1, is used by the supervisor. This is the part of the operating system that provides the non-privileged functions. This code is nevertheless "trusted code" and can have access to resources that are not available to user programs. While running user code this region is normally disabled. On a SVC the handling routine, in R0, not only switches the call to the relevant routine in R1 but also disables the privileged state and enables R1.

There is often a large body of utilities in a system which is used by most programs. If the data which they access is protected, then there is no reason why these utilities cannot automatically be made available to all users in an execute only mode. Thus, R2 is used as a utility region, available to all processes and always enabled.

The last region, R3, is the user region. This region contains the process specific code and data. The mapping of this virtual address space into an associated physical address differs from process to process. This re-mapping is performed by changing registers in the MAC.

Data Structures

The data structures to be discussed in this section fall into classes, those that are necessary for the MAC and those that logically exist within an operating system. The OS clearly needs information as to where its components are. In this example this will be called the System Block (SB). Each process or task also needs to set of parameters which define its state. Although these parameters need not be gathered into a block in one place, we will assume that this has been done and they are present in the Task Control Block (TCB).

The table structures involved in virtual memory are the Segment Tables and the Page Tables. The TCB contains pointers to and length registers for the two segment tables currently in use by the process. That Segment Table contains entries describing the segments available to the process. A segment is a logical extent of memory which is to be treated in a uniform way, i.e. it has the same protection and location characteristics. The Page Table contains the address space mappings between virtual and real addresses obtaining at that time. The page tables also contain page status, i.e. history, and current place in the memory hierarchy. Pictorially this can be represented for an individual task as shown in FIG. 7.

This structure of a segmented memory with a paging scheme underneath has been chosen because it:
1. allows simple systems to be made;
2. allows secure, protected systems to be made;
3. allows sharing of segments with different permissions;
4. allows each process to start numbering its elements from zero; and
5. also allows the memory management software to keep track of which pages to swap.

The System Status Block

If any system regions are defined, then this block contains the pointers to the segment tables of the regions dedicated to the system. Normally these pointers are not changed, i.e. they are set on system load and are static thereafter. Note that these registers need not exist in memory as they are contained on the MAC. The system will however have to keep track of the status of the enable bits.

The Task Control Block

This must now contain a pointer to the process's segment table and a count of its current length. The count is necessary to ensure that a process cannot access an area beyond its segment table assuming that it contains a valid segment descriptor.

When loading a new segment table pointer into the MAC all cache references in that region are automatically marked as invalid.

Segment Tables

Figure 5:
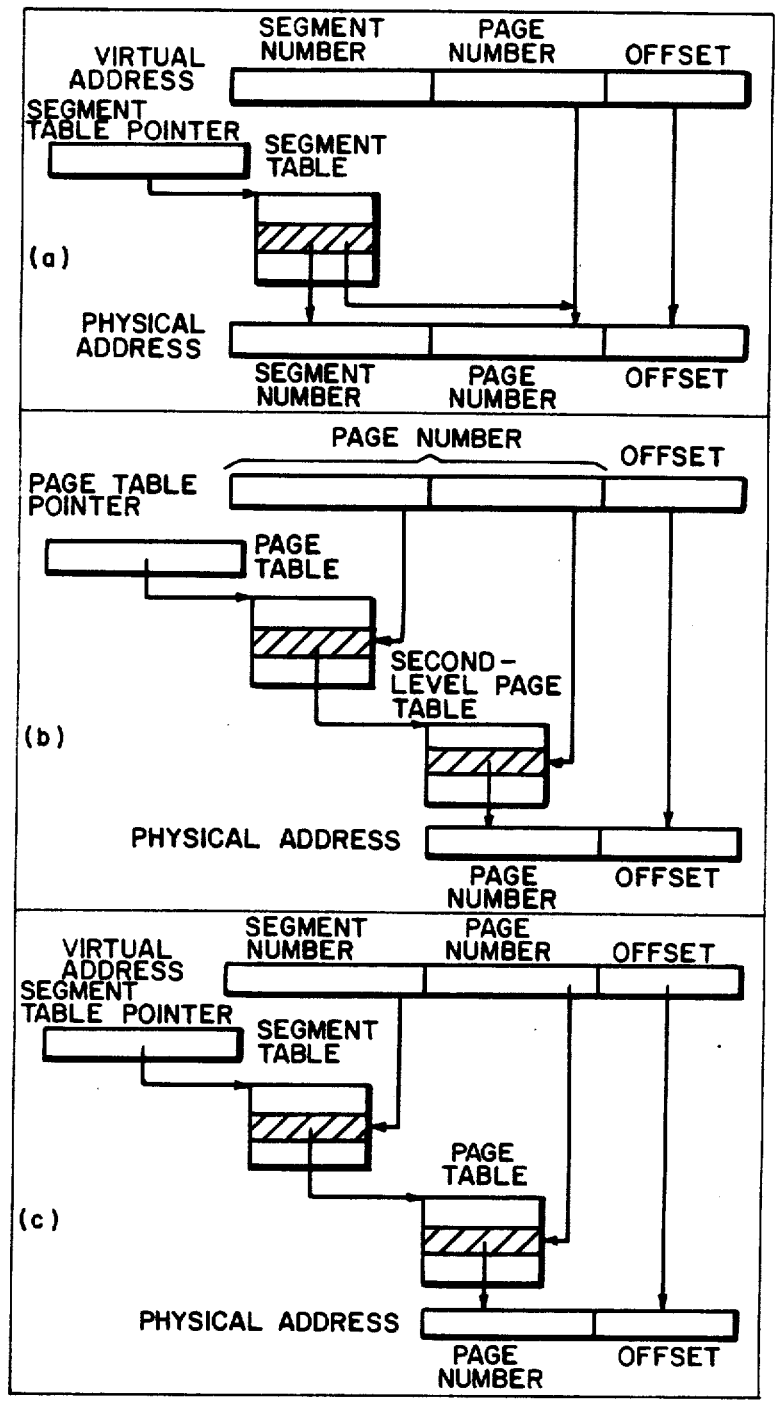
FIGS. 5A, 5B and 5C illustrate the data structures of the present invention.

At any instance there are one to four valid segment tables depending on how many regions have been defined and enabled. The Segment table consists of three fields, as shown in FIGS. 5A, 5B and 5C.

The Page Table Pointer

This 32 bit field contains the pointer to the page table which defines the current segment. Page tables must be aligned on long-word boundaries in memory.

The Page Table Length

This 23 bit register contains the length of the segment in pages.

Segment Protection

Each use of a segment is protected differently depending on the permissions granted to each process. This 9 bit register contains the bits which define the status of the segment. These bits are:
1. Supervisor Permission (S) needed to access this segment
2-4. Access Permission Bits.

The three access permission bits allow the access mode if set. These bits are:
Read Access (RA)
Write Access (WA)
Execute Access (EA)
5. Valid (V)

This bit is used to indicate whether the segment is valid or not.
6. Software Protection (SP)

If this bit is set, a trap will be generated the first time the associated segment is accessed. Subsequent accesses to the segment may or may not generate a trap. Thus, the trap handling software should either reset this bit after the first interrupt, or should be capable of handling multiple traps. This bit is meant to provide a software filter for entry into segments.

The final three bits define how the segment can be mapped. These are:
1. Non-cacheable (NC)

If the associated segment contains semaphores or could be used by two processors or I/O units concurrently it should be so marked.
2. Local (L)

This indicates that the segment is stored in one or more memories local to the processor.
3. Contiguous (C)

This bit indicates that the segment has no page table. It is a segment-only and should be mapped into memory as a whole.

FIG. 8A shows the format of the segment descriptors in the Segment Table for a paged (non-contiguous) segment; FIG. 8B shows the format of the contiguous segments' descriptors.

The Page Tables

The page table is split into two fields totalling 4 bytes which are always used by the hardware.
They contain:
1. The 19 bit pointer to the physical address of the beginning of the page.
2. Three page-history bits:
Present (P): page is present in memory.
Used (U): page is used since this bit is last reset.
Dirty (D): page is written to since this bit is last reset.
3. Six software bist (SW). These bits may be used by software for any purpose.
4. Local memory identification (LI). The MAC supports systems with up to 16 local memories. If a segment is marked local, these bits indicate in which local memory the page is resident. This will be checked against the contents of the Processor Identification Register and a BERR will be generated whenever a segment, marked as local, is not in that processor's local memory.

FIG. 9 shows the format of the page descriptors in the Page Table in memory.

Residence of System Tables

It may be desirable to place most of the system tables mentioned above in virtual memory without necessarily having them in physical memory all the time.

The MAC and the 68010/20 structure clearly allow multiple page faults while fielding a cache fault, i.e. if the MAC needs a descriptor and finds that the descriptor itself is not present in the physical memory then it will generate a BERR giving the address of the descriptor as well as the cause of the access fault. Thus, the only tables that need to be always present in the physical memory are those of the interrupt handling routines and the memory management routines (ie. the tables containing pointers to the segment and page tables). It should be noted that a page fault does not indicate any error condition; rather it indicates that an action is needed. However, a page error indicates that an error has occurred; either an access was made to a segment for which the requisite permissions were not held or that an access was made to an invalid segment.

Memory Protection and Sharing

The MAC provides mechanisms for implementing systems with varying degrees of protection. The simplest protected system would only separate user code from OS code.

Protection is basically provided by only giving a process access to the resources it needs. These resources include memory and I/O. Access to I/O is accomplished by giving a process access to the necessary I/O management routines. This access can be execute-only and the entrance to these routines can be controlled via hardware in the normal SVC manner or by putting a software "gateway" as the access point. This gateway is essentially an execute-only segment which can be marked so as to cause a trap when entered. Thus, a trusted program can be used to do the I/O access or to provide extra entry points to the calling program. For example, if a file is opened then this technique can add segments to the calling process's virtual address space, where each segment performs an I/O function. The process will only have access to these routines.

Naturally, this process will only be effective if a process is forbidden to access its segment descriptors. This is achieved by not putting the segment tables belonging to a process in a segment directly accessible to the process. Naturally this segment is accessible to the OS and the MAC.

Sharing of code and data can be accomplished by merely putting a segment descriptor pointing to the same page table in more than one process's segment table. Note that these segments can have different virtual addresses for the different processes. Message passing can then be easily and efficiently implemented by asking the operating system to "add" a descriptor to another process's address space.

Sub-Setting Facilities for Simple Systems

The MAC can be used as an MMU either with or without using the cache controller function.

If a simple system is desired, a sub-set of the MAC's possibilities can be used. The following are some examples of possible system configurations:

a. A Purely Paged System
   This would have only one region with one segment containing program and data.
b. A Minimally Protected System
   This would have one region with two segments, for code and data, with no paging within each segment.
c. A Minimally Protected Stack Based System
   This would have one more segment for each stack used. This could be used to easily allocate stack space as it is needed, while still controlling unlimited growth.

Clearly, more examples can be generated. These are only provided to emphasize that all the facilities need not always be used.

THE MEMORY ACCESS CONTROLLER

The MAC can be thought of as two cooperating units. These are the cache controller section and the memory mapping unit (MMU). Between them, they provide all the functions needed in the MAC. This architecture is shown in FIG. 1.

The Cache Controller

The cache controller manages a semi-associative cache. It has a working set of 32 subcaches. These subcaches are defined not only by the address, but also implicitly by the address space. The MAC recognizes four address spaces defined by the regions. The region definitions are independent of their use in the system. System designers can use them for whatever purpose they need or want.

However, the same virtual address cannot be used in different regions. The distinction between the regions, in the cache controller, is made purely to allow the cache entries belonging to the separate address spaces to be invalidated for a region as a whole. If a system's dynamic working set is favorable, this will allow interrupt service routines, for instance, to remain in the cache while the processor continues a process or even changes processes.

On the reset, the cache is marked as empty and all 32 sub-caches are available to all four regions. All sub-caches which are in use by a region are automatically marked as empty whenever that region's Segment Table Pointer Register (STPR) is loaded. Accesses to CPU space function code 0111 are never cached, as they are used to access co-processors.

A word can only get into the cache if it has satisfied the criteria of the segment descriptor. Thus, when a word is read and it is found in the cache, it is valid if the processor has the necessary permissions. A copy of the segment permission rights is kept with the associated subcache. If a write is performed, then this is only written into the cache if the processor has write permission. The dirty bit in the MMU section of the MAC and the page table is updated.

If it is so desired, the cache can be disabled. The cache is automatically disabled on reset. It can be enabled by writing into the mode register.

POLICY ON WRITING

Write Through

When a write is accomplished the information is written to the memory. Only when a subcache is already allocated for this data, is the information also written to the cache. If the width of the data to be written is the same as the cache width, then the relevant block presence bit is marked as valid. If the width of the write datum is not the same as the cache block width, then the presence bit is left unchanged.

Read/Write Overlap

On a write the MAC will strobe the address and data into latches and start a memory write cycle. Before doing so it will check if it has the required descriptor; if not it will fetch it from memory. If it is not already set, the MAC will also set the dirty bit in both the page table in memory and the page descriptor cache, (translation look-aside buffer (TLB), on the MAC. Then it will allow the processor to proceed by asserting the DTACK signal to the processor while the memory transfer is taking place. The processor will be allowed to proceed unless it requests another memory transfer (either a cache read-miss or a write) before the first write is complete.

Size of the Cache

The size of the cache is not infinitely variable, but can be expanded in both width and depth.

The width can be expanded in units of 16 bits. The block can be configured to be 1, 2, 4 or 8 units wide i.e. 16, 32, 64 or 128 bits wide. This width, the block size, is independent of the width of the data path to the processor; it is the width of the data path between the cache and the memory.

The length of the cache can also vary and, again, the lengths to which it can be extended are limited. These limits are 1024, 2048 or 4096 blocks deep.

In terms of bytes the cache can then vary from a minimum of 2K bytes, 1K blocks of 2 bytes, to 64K bytes, 4K blocks of 16 bytes.

Although the actual number is application dependent, in general, a cache of 1024 blocks of 4 words, i.e. 1K×64, will result in the processor seeing a cache access time for at least 95% of the memory accesses. For example, if a cache hit or an overlapped write occur fast enough not to cause any wait states in the processor and a memory access results in 4 wait states then the average number of wait states per memory access is 0.2. These figures are realistic for a 16 MHz 68010/20 coupled to a slow, 250 ns access, memory.

THE MEMORY MAPPING UNIT

Introduction

The Memory Mapping Unit performs paging control between three levels of memory. These three levels are:
1. Background Memory (Disk)
2. System Memory (RAM)
3. Local Memory (RAM)

This last memory is not always present. In a multiprocessor situation it may be desirable, in order to reduce bus traffic, to attach a local memory to each or some of the processors. If so, the MAC is capable of providing signals to the processor if the segment is marked as belonging to local memory. A page fault trap will be generated if the accessed page is not present in the local memory. Thus the MAC can not only control paging between the system memory and the background memory but also between local memories and the system memory or background memory.

The Memory Mapping Unit (MMU) section of the MAC contains descriptors for 32 pages which are loaded on demand by the MAC. As in the cache, each page is identified only by its logical address.

In addition the MMU contains four register triplets. These consist of a Region Definition Register (RDR), a Segment Table Pointer Register (STPR) and a Segment Table Length Register (STLR). Each of these triplets define the current context of their respective regions. Note that region 3 (RDR3) exists conceptually but not physically.

The page descriptors are in a fully associative descriptor cache on the MAC. Each descriptor consists of the following fields, as shown in FIGS. 8A and 8B:
1. a 19 bit physical address;
2. 4 permission bits i.e.
   Supervisor permission needed;
   Access Permission Bits:
   Read Access (RA);
   Write Access (WA);
   Execute Access (EA);
3. Page management bits i.e.
   Non-cacheable (NC);
   Local (L);
4. A dirty bit (D) i.e. the page has been written into.

Descriptor Cache Miss

Figure 12:
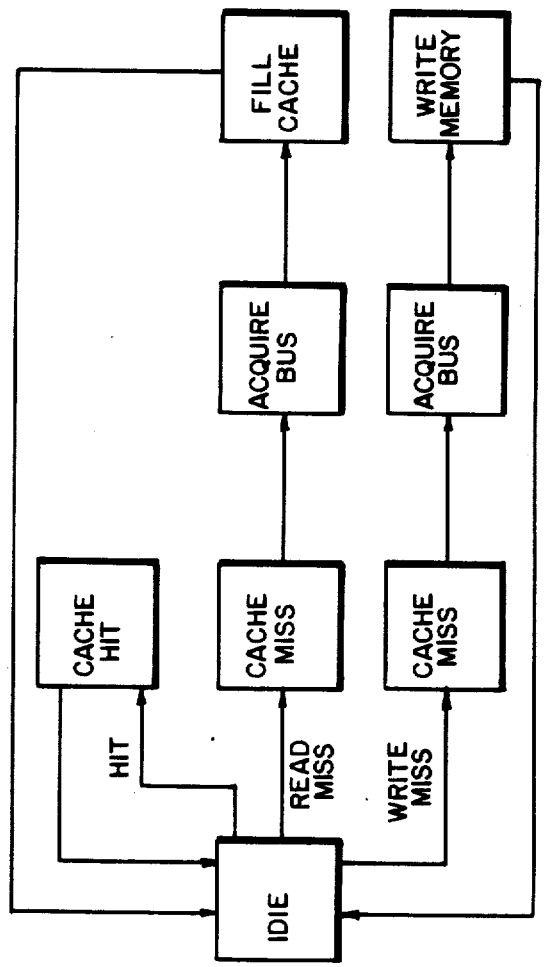
FIG. 12 is a flow chart for cache hits and misses.

If a word is read and it is not in the cache, then the MMU section is accessed to find its physical address. If the relevant page descriptor is not in the MMU then the MAC will use the region STPR to find it. This will be used together with the length established in the STLR register. Only if the page is not present in memory will a page fault be generated by asserting BERR. FIG. 12 is a flow chart for cache hits and misses.

During the process of fetching the segment descriptor the MAC checks to see whether the segment number is valid, i.e. it is less than the length set in the register for the address space, relative to the lower region boundary. It also checks to see that the page number is not greater than the maximum page number in the segment descriptor. If either of these conditions is violated than a fault notification is generated. If the segment is marked as local and this check is enabled, then the page descriptor will be checked to see if the page is in the requesting processor's local memory.

If the used bit is not set in the page descriptor in memory, then it is set by the MAC.

Handling of the Dirty Bit

If any permitted write is made to a page and the dirty bit in the page descriptor in the cache is not set, then it is set both in the descriptor cache and in the memory.

Handling of Illegal Accesses to Memory

If an access is made to a memory location for which the required permission bits are not set then the BERR is set. The offending address and the reason are stored on the MAC stack in memory.

If an access to a non-resident page is made, the same procedure will be followed. This will be done whether the page at fault was the desired page or a page containing either the segment table or the page table.

MAC Stack in Memory

Part of the communication between the MAC and the controlling processor is done via the so-called MAC stack in main memory. Each MAC in a system must have such a stack, occupying the first 512 bytes of one page that should always be present in memory. When the page size is larger than 512 bytes, the remainder is not used by the MAC and may be used for other purposes. The MSPR register on the MAC stores the physical address of the page frame in memory containing the stack. This stack is used in the following way:

Error Reporting

When an error or a page fault is detected by the MAC during its operation, an error report containing the address causing the error as well as a description of the problem is stored in the stack by the MAC. The MAC then generates an BERR to the processor.

The 512 byte stack is divided in 8 sections which are indexed by the FC2-0 signals. Index 000 indicates the section for the processor, the remaining seven sections are for I/O devices.

The processor section is used to store the faulting address and the error cause in case of an error or page fault on an attempted memory access by the processor. This section also contains the virtual and real addresses used in the address translation command.

The other seven sections are each divided into 8 blocks. Each of those (8 byte) blocks can contain an error report consisting of the faulting address plus a description of the problem. A "written" bit in each of those blocks is set whenever the MAC writes an error report in that block. This bit then indicates that the block contains an error report to be serviced by the processor and it can be reset by the processor only after it has handled the error. The MAC will write an error report in a block only when the "written" bit is not set.

As there are eight blocks in each section and each section is dedicated to one I/O device, the I/O devices can have up to 8 channels each, except when they rerun their bus cycle upon receiving the first BERR. Such devices may have only 4 channels each as their error reports will be written into the memory stack twice.

Address Translation

The MAC provides a facility to translate a virtual address into a real address. The processor will write the virtual address on a specified location in the processor section of the MAC stack. In then gives the MAC the Translate command (by writing to the TR register). The MAC will read the address from the memory and will translate this to a real address which then is stored at another location in the MAC stack.

When the command execution is completed, the MAC will generate a DTACK signal to the processor.

THE MAC's PLACE IN THE SYSTEM

It is possible to have one or more MACs in the system; there can be one non MAC in the system, a multi-processor, multi-MAC system, and multiple MACs attached to one processor in a system. FIGS. 3A through 3E illustrate these embodiments.

THE MAC ATTACHED TO THE PROCESSOR

Real I/O Addresses

A picture of a system with one processor with an attached MAC is shown in FIG. 3A. The MAC handles all the processor requests to memory and completely controls the cache. This is a fairly straightforward solution, as all the DMA (direct memory access) requests use real addresses. While this is fairly straightforward for the hardware, the software has to arrange that blocks which have to be DMA'd into memory fit into consecutive real addresses, unless the DMA units can handle a scattered real memory.

Virtual I/O Addresses

Figure 3B:
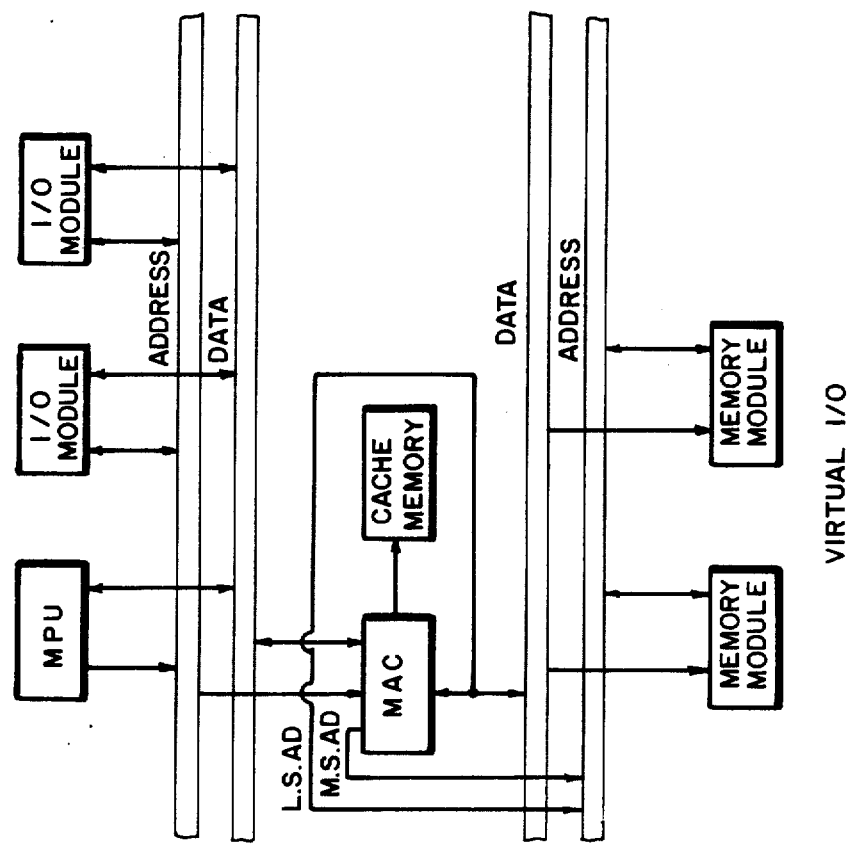

This system is shown in FIG. 3B. It is much easier for the software to handle, but the address bus onto which the DMA peripherals hang is the bus between the processor and the MAC. This is fine for a system with limited modularity, but is difficult for a system which needs the traditional modularity, e.g. on the card level of a mini-computer. If that type of system is needed then the configuration given in FIG. 3E can be used, i.e. with a separate MAC dedicated to I/O.

I/O units using a MAC for address translation must drive the FC3 signal high. The MAC will then skip the check on access violations. FC2-0 can be used to identify each of up to 7 I/O units connected to the MAC (note that FC2-0=000 is reserved and may not be used for I/O identification). When an error occurs the MAC will store the error report in the appropriate section on the stack in memory.

Multiple MACs Attached to Multiple Processors

This can be accomplished in two ways depending upon the system needs.

Systems Without Local Memory

Figure 3C:
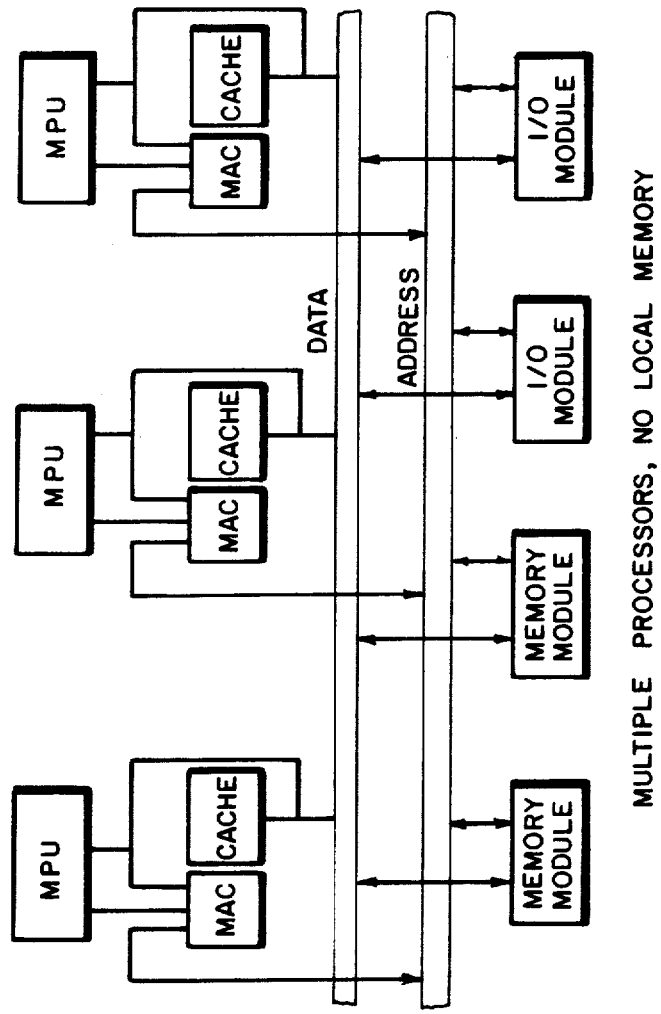
Figure 3D:
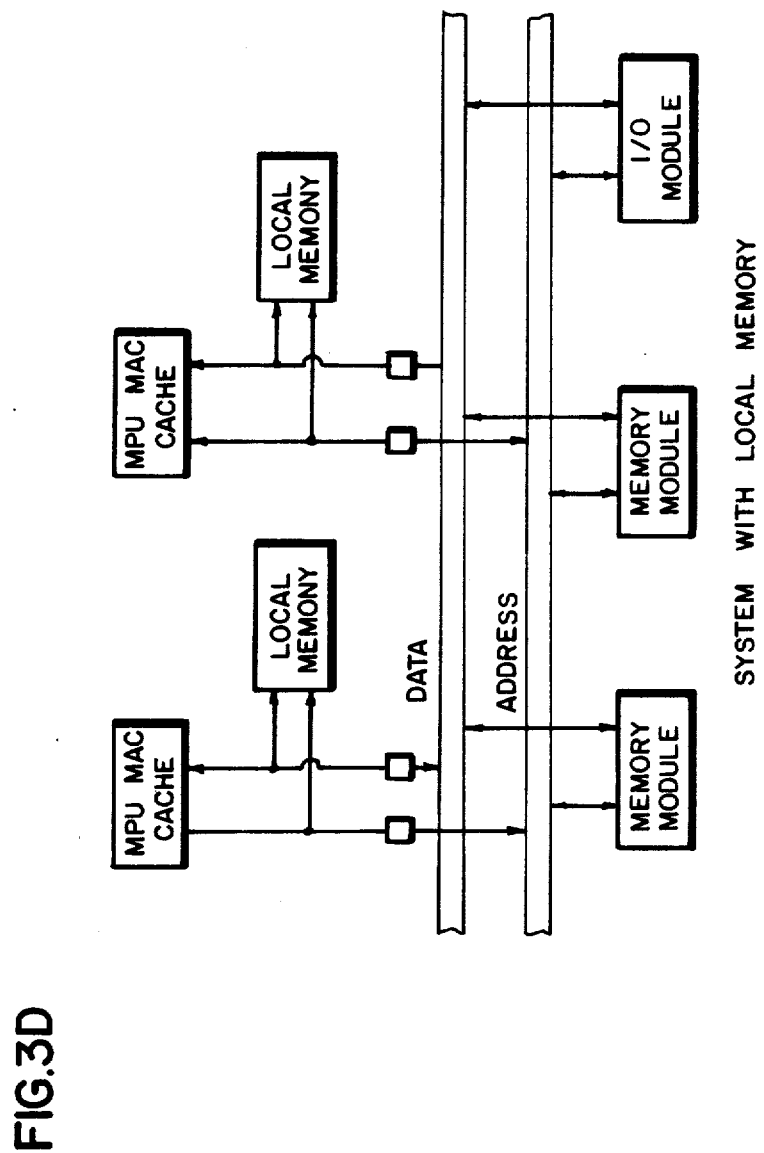
Figure 3E:
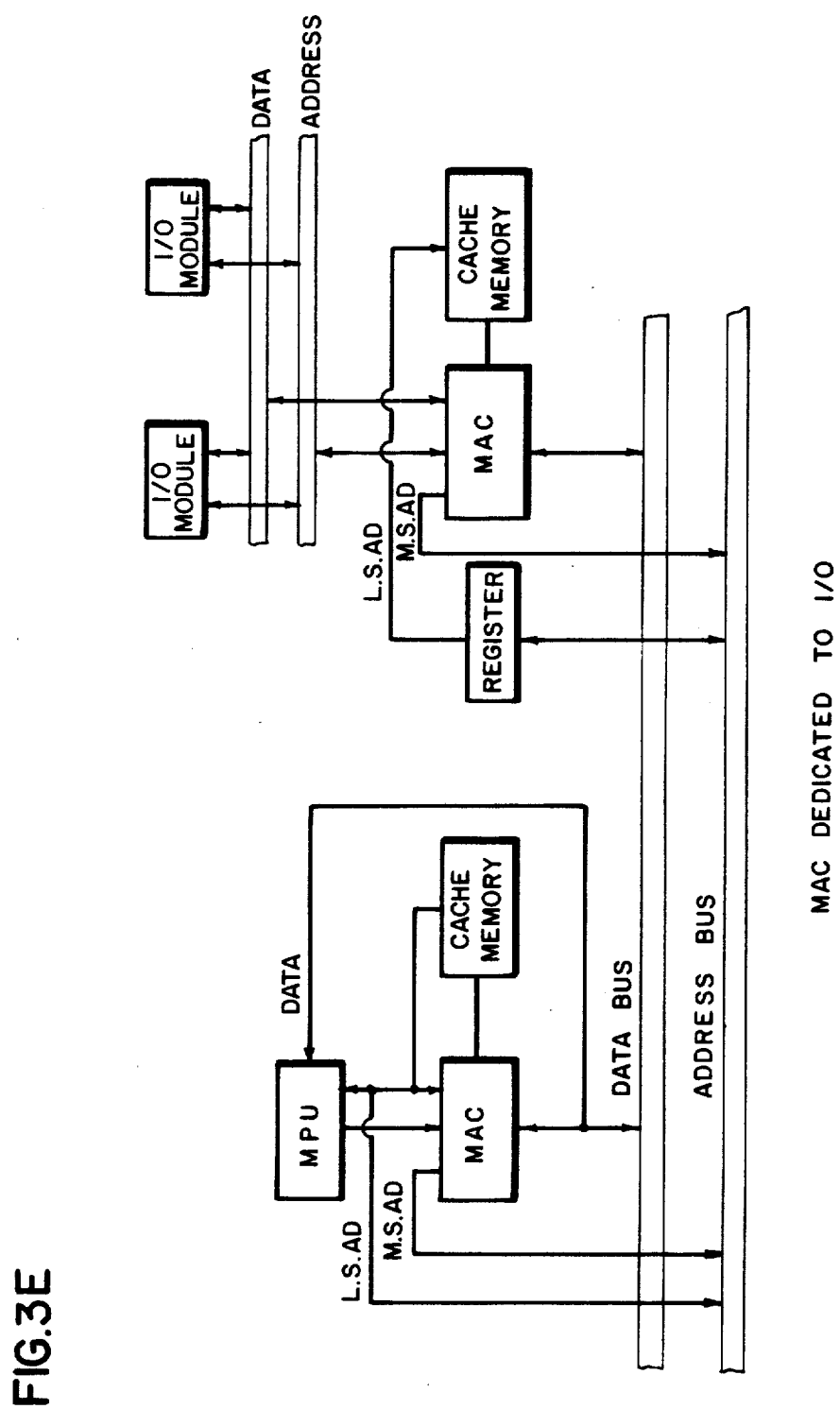

A typical system like this is shown in FIG. 3C. This sort of system will allow up to four 68010s to work without seriously disturbing one another. If they work in a MIMD, multi-instruction stream, multi-data stream mode, i.e. each working on its own process but only one running each section of the operating system at a time, then typically four 68010s should give the performance of about 3.2 68101s, each running in their own system. This assumes that the processors are memory bound and not I/O bound.

Note that although FIG. 3C shows processors each with their own MAC, these processors could just as easily be I/O units with DMA properties.

Systems with Local Memories

A typical system like this is shown in FIG. 3D. Systems like this can be used if there is a way to partition the application. This can be done in many ways depending upon the complexity of the system and the software.

Some applications can be partitioned statically, e.g. a process control system where the task can be pre-assigned to a processor. In this case, the local memory can be used for code and to process specific data, e.g. stacks.

Of course, applications that are reassigned dynamically can also be processed using this system arrangement. The MAC provides facilities to page in and out of local memories. It monitors which page is where the asserts BERR when a processor requires access to a page which is marked as local and is not yet marked as being in that particular processor's local memory.

External accesses to a local memory (i.e. from other processors' I/O units via the global bus) are handled in the following way. The global bus control will in this case generate a Bus Request signal to the MAC (or MAC's). The MAC will respond to this only when it is at a point in its processing where the decision is taken whether the current processor cycle will require cache access, main or local memory access or a full address translation. As soon as this internal decision is made by the MAC, it will halt the processor and grant the local bus by asserting the BR signal. The external access to the local memory can now take place. Only after the access is completed may the BR signal be negated after which the MAC will resume its cycle in the way it decided upon before.

The MAC allows up to 16 680×0s, each having its own local memory, to cooperate together. In particular, with the requisite system software it is possible to write application programs that could run unchanged in either a single processor system or a multiprocessor system with or without local memory.

The Use of Multiple MACs Attached to One Processor

In some special cases there may be a need to attach more than one MAC to a processor. Normally this should not be necessary as the cache hit rate should be high enough (>90%) and the descriptor cache hit rate should be better than 99.5%. However if this is not enough or if a fast response is wanted for interrupts then multiple MACs can be used.

The MAC will keep all its lines in a high impedance state when AS is high. Therefore, multiple MACs can be used by gating AS with another address line(s). Note this address line should not be part of the offset within a page as that will reduce the effect of adding more than one MAC. If very fast real-time processing is needed than a separate MAC could be used for the supervisor state in order to handle the real time problems. In that case FC2 could be gated with AS on one MAC, and the inverse of FC2 could be gated with AS on the other MAC.

If multiple MACs are attached to one processor then all the MACs have to have identical region and STPR definitions.

MAC REGISTERS

Figure 10A:
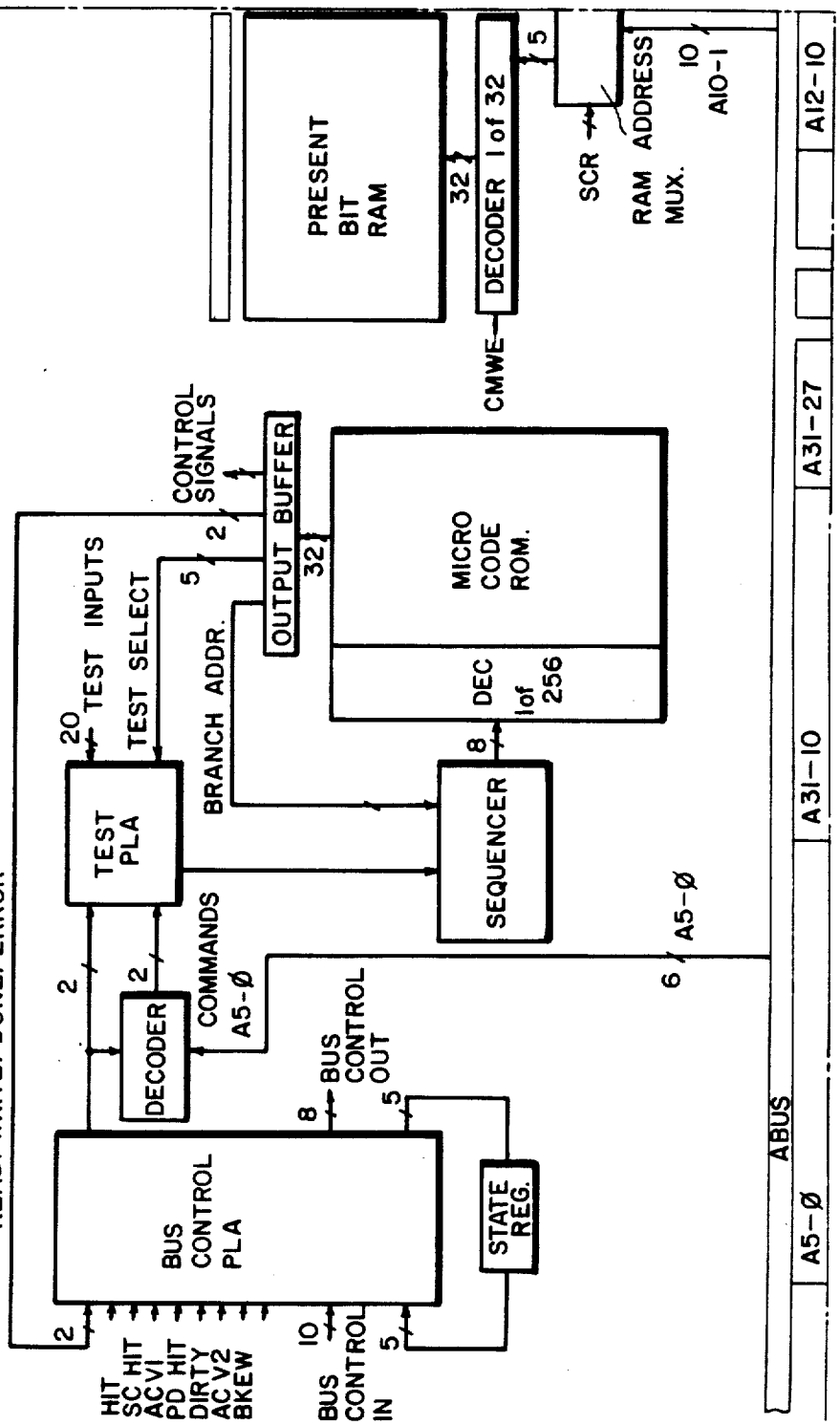
Figure 10B:
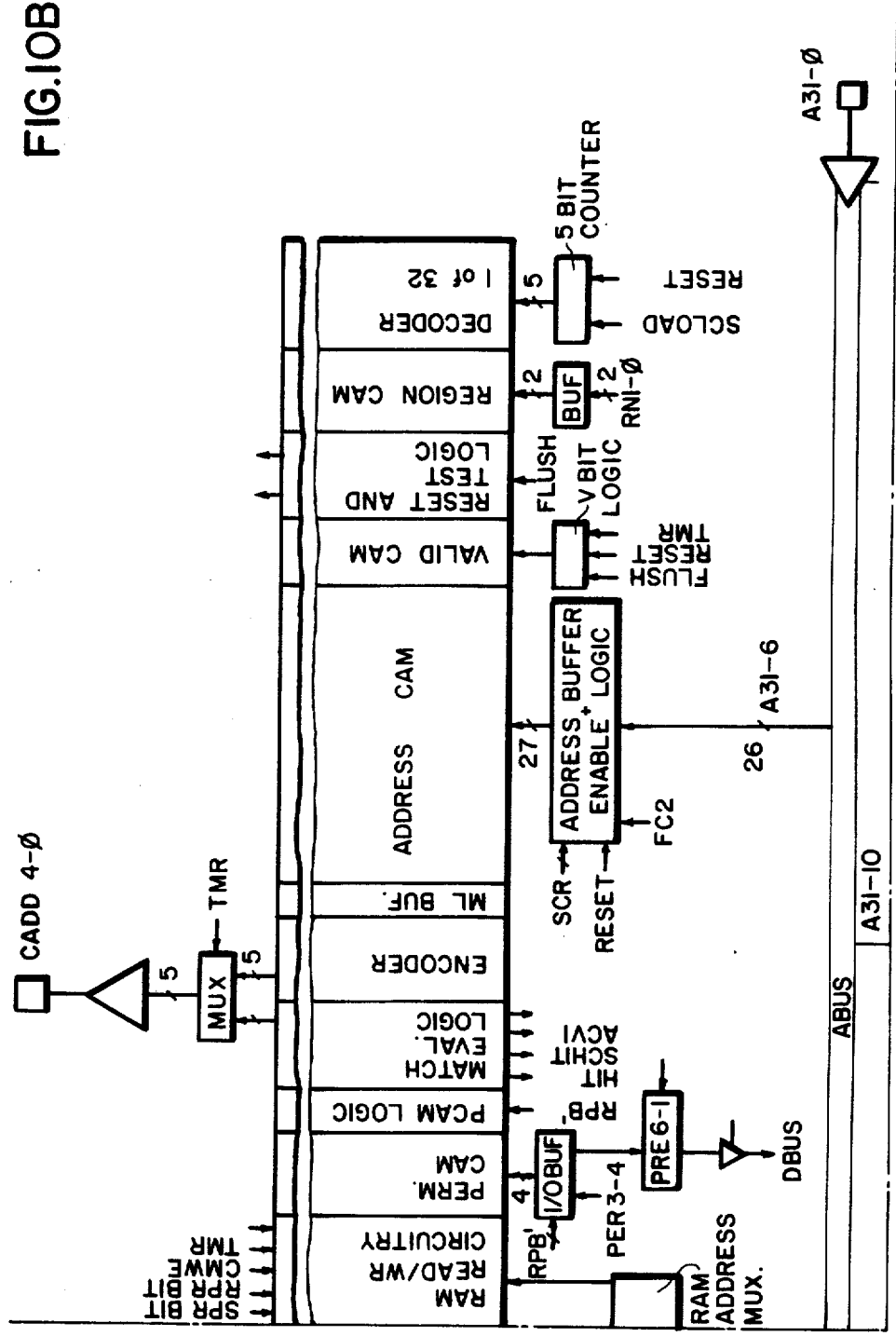
Figure 10C:
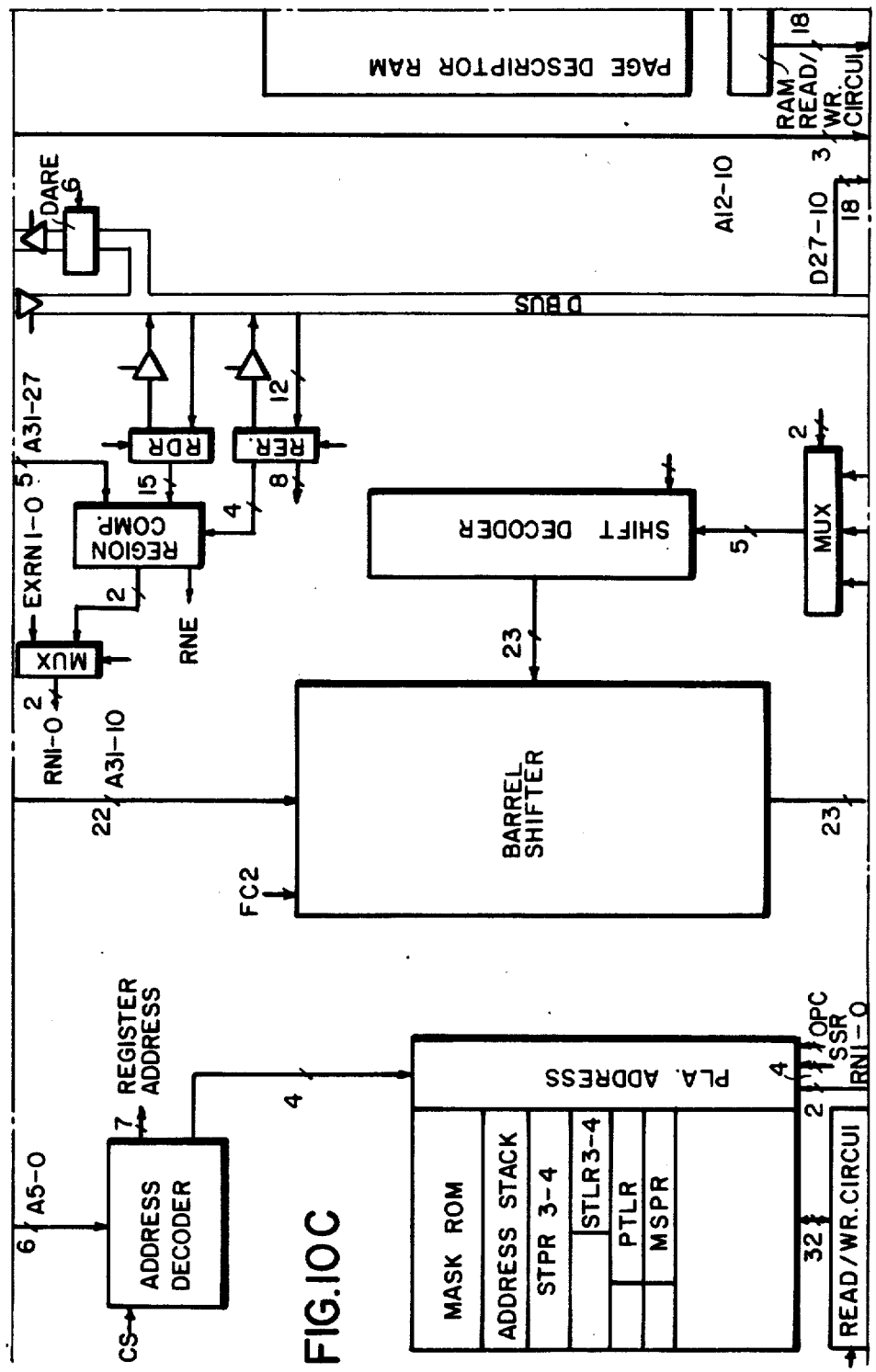
Figure 10E:
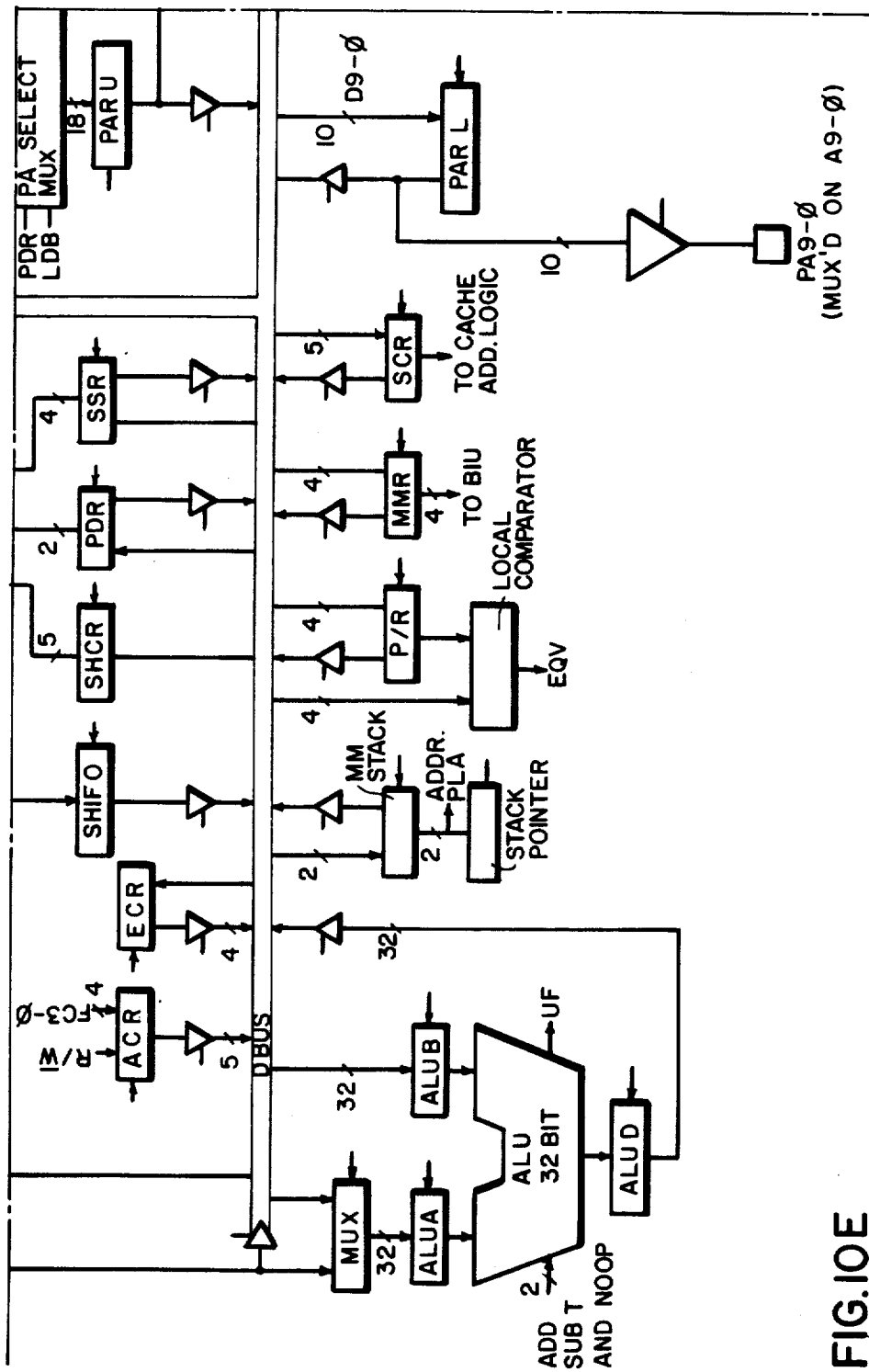
Figure 10F:
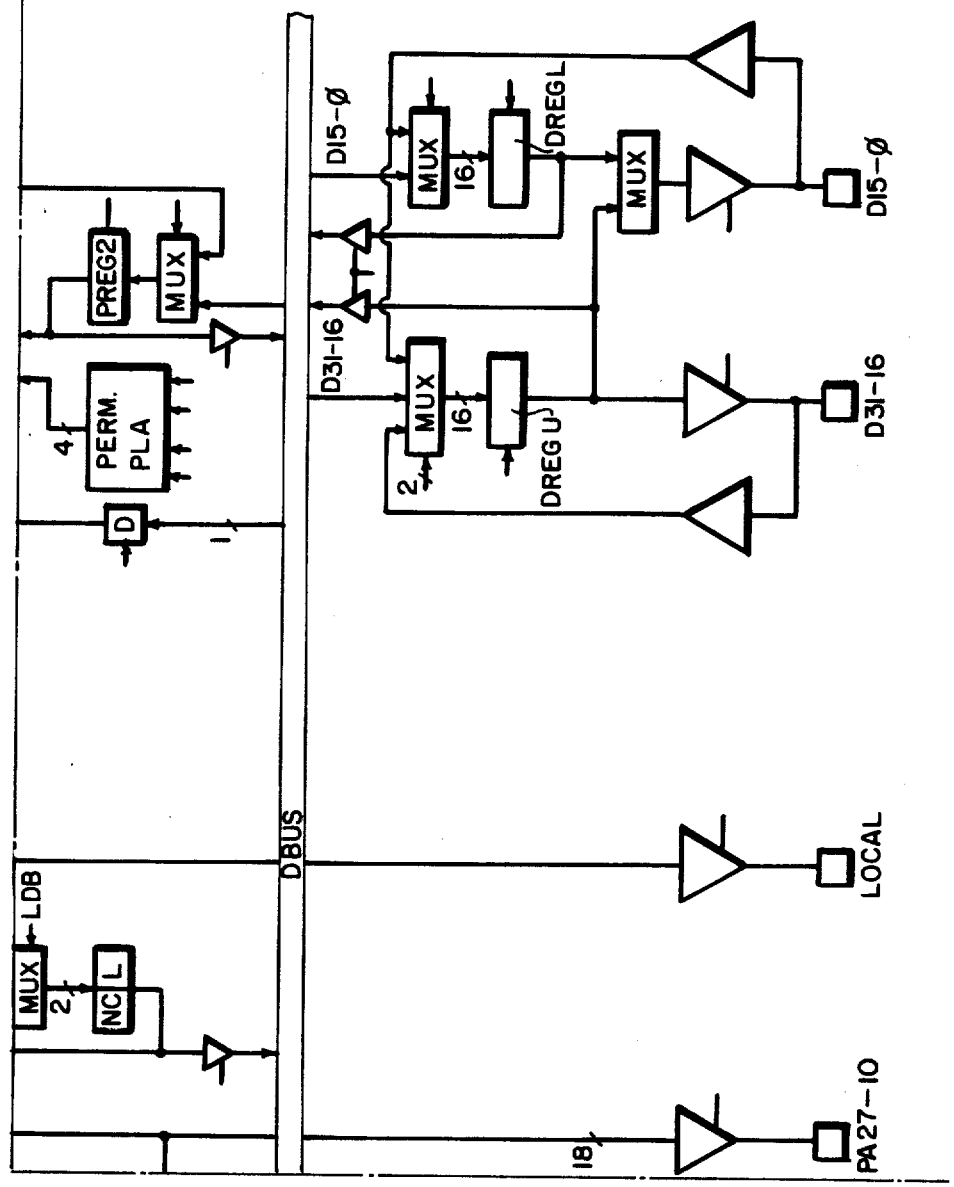

FIGS. 10A and 10F are detailed block diagrams of the MAC. The following text is illustrated in these Figures.

The registers on the MAC are used for five purposes:
1. By the processor to inform the MAC of the hardware system configuration.
2. By the processor to inform the MAC of the software (table) configuration.
3. By the processor to give the MAC pointer information e.g. table and stack pointers.
4. By the MAC to inform the processor of its status.
5. As a mailbox. The MAC can be regarded as a subroutine embodied in hardware for certain functions. Writing to certain (virtual) registers will cause the MAC to execute a command.

The MAC will issue a BERR if any access to a register is made without using a supervisor function code.

Registers on the MAC can be accessed by the processor when the Chip Select input is active. The register addresses are then decoded from address inputs A6-2.

Configuration Registers

These registers define the hardware configuration of the system. Essentially they describe parameters like cache size, page length etc.

| Page Definition Register (PDR) | |
|---|---|
| Address 00001 Read/Write | Size 3 bits |

The bits of this register are used to indicate the page size.

These bits not only indicate the size of the page, but also indicate whether FC2 should be used to split the address space. Note that this indication is also given in the SCR register and needs to be repeated.

| Bits 2–0 | FC2 split of Add Space | Page Size |
|---|---|---|
| 000 | No | 512 (bytes) |
| 001 | No | 1024 |
| 010 | No | 2048 |
| 011 | No | 4096 |
| 100 | Yes | 512 |
| 101 | Yes | 1024 |
| 110 | Yes | 2048 |
| 111 | Yes | 4096 |

| Size of Segment Register (SSR) | |
|---|---|
| Address 00010 Read/Write | Size 4 bits |

This register, which is reset to zero on a MAC reset, defines the part of the address that selects a segment. The contents of the SSR is the encoded number of address bits, starting from A31, that are part of the segment number.

If less then five bits are used for the segment number, the split of the address space into regions is no longer supported. In those cases the whole address space will be treated as region 0.

| Size of Cache Register (SCR) | |
|---|---|
| Address 00100 Read/Write | Size 5 bits |

This register specifies the cache organization. The meaning of the bits which are all reset to zero on a MAC reset are:

| Bits 4–0 | FC2 split of Add Space | Block Size | Cache Depth |
|---|---|---|---|
| 00000 | No | 16 bits | 1024 |
| 00001 | No | 32 bits | 1024 |
| 00010 | No | 64 bits | 1024 |
| 00011 | No | 128 bits | 1024 |
| 00100 | No | 16 bits | 2048 |
| 00101 | No | 32 bits | 2048 |
| 00110 | No | 64 bits | 2048 |
| 00111 | No | 128 bits | 2048 |
| 01000 | No | 16 bits | 4096 |
| 01001 | No | 32 bits | 4096 |
| 01010 | No | 64 bits | 4096 |
| 01011 | No | 128 bits | 4086 |
| 01100 | No | 16 bits | 1024 |
| 01101 | No | 32 bits | 1024 |
| 01110 | No | 64 bits | 1024 |
| 01111 | No | 128 bits | 1024 |
| 10000 | Yes | 16 bits | 1024 |
| 10001 | Yes | 32 bits | 1024 |
| 10010 | Yes | 64 bits | 1024 |
| 10011 | Yes | 128 bits | 1024 |
| 10100 | Yes | 16 bits | 2048 |
| 10101 | Yes | 32 bits | 2048 |
| 10110 | Yes | 64 bits | 2048 |
| 10111 | Yes | 128 bits | 2048 |
| 11000 | Yes | 16 bits | 4096 |

| Bits 4–0 | FC2 split of Add Space | Block Size | Cache Depth |
|---|---|---|---|
| 11001 | Yes | 32 bits | 4096 |
| 11010 | Yes | 64 bits | 4096 |
| 11011 | Yes | 128 bits | 4096 |
| 11100 | Yes | 16 bits | 1024 |
| 11101 | Yes | 32 bits | 1024 |
| 11110 | Yes | 64 bits | 1024 |
| 11111 | Yes | 128 bits | 1024 |

| MAC Mode Register (MMR) | |
|---|---|
| Address 10000 Read/Write | Size 8 bits |

On reset the MAC resets this register to zero. It has to be set if the MAC is to be used. The meaning of the bits are:
Bit 0 If set, it indicates that there is a cache attached to the MAC.
Bit 1 If set, this bit enables the MAC. When the MAC is enabled the addresses are translated in the chosen manner and the cache is used in the configuration given in the SCR. When the MAC is disabled, the cache is effectively not present and all addresses are passed through the MAC without any change.

As loading this register enables the MAC, this register should only be loaded when all the other registers have been loaded.

Address Space Configuration Registers

These registers are used to divide the virtual address space into different regions. As explained above the virtual address space need not be divided into regions, it an be configured as a monolith.

| Region Enable Register (RER) | |
|---|---|
| Address 10100 Read/Write | Size 12 bits |

This register establishes which regions are active and define the region attributes. Each region'status is defined by 3 bits which have the following meaning:
Bit 0 If unset segment tables are in real memory; if set, segment tables are in virtual memory.
Bit 1 If unset, page tables are in real memory; if set, page tables are in virtual memory.
Bit 2 If set, the region is disabled; if unset, the region is enabled. On reset the register is reset.
When an access is attempted to a region for which the enable bit is not set, a BERR will be generated.

| Region Definition Register (RDR) | |
|---|---|
| Address 00100 Read/Write | Size 16 bits |

This register defines the boundaries of regions 0, 1 and 2 explicitly and region 3 implicitly. The register is split up in three fields, defining the most significant bits of the top of each region. Those bits are extended to a full address by 26 ones in the least significant bit positions. So, bits 4–0 define the highest address in region 0. Region 1 is defined from the top of region 0 to the address specified by bits 9–5 of the RDR, extended with 26 ones. Similarly, region 2 is defined by the top of region 1 at its low end and bits 14–10 of RDR at its high end. Region 3 is defined from the top of region 2 to FFFFFFFF at its top end. Bit 15 is not used.

```
15 14 10 9  5 4   0
[x|RB2|RB1|RB0]
```

RDR lay out

If FC2 is used as the 33rd address bit, region 3 will always contain at least the whole space where FC2=1. In this case a minimum of two regions must be defined i.e. 0 and 3. Possible configurations are:

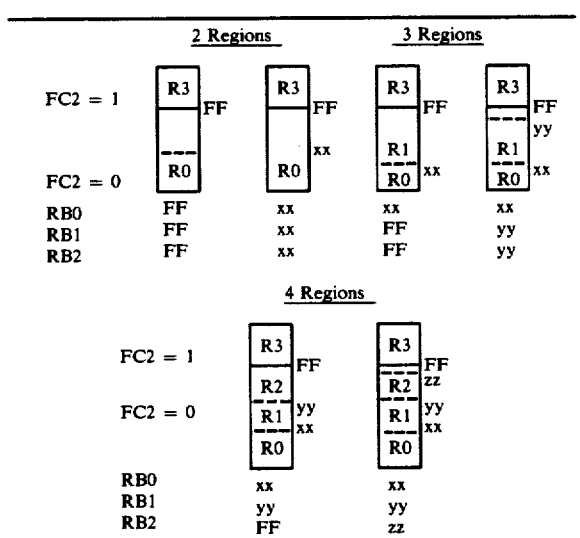

Pointer Registers

These registers contain pointers and length information to be used by the MAC.

| Segment Table Pointer Registers (STPR0-3) | |
|---|---|
| Address 01000, 01001, 01010, 01011. Read/Write | Size 32 bits each |

These registers contain the address of the segment tables currently valid. When it is loaded, all the mappings in the MAC in the relevant region are reset; i.e. the cache appears empty of all addresses in the region and all page descriptors in the MAC in the region's address space are invalidated.

As Segment Tables should be positioned in memory on 8 byte boundaries, the three least significant bits of these points must all be 0.

| Segment Table Length Registers (STLR3-0) | |
|---|---|
| Address 01100, 01101, 01110, 01111 Read/Write | Size 16 bits each |

These registers contain the length (i.e. the number of segments) of the segment tables currently valid.

| MAC Stack Pointer Register (MSPR) | |
|---|---|
| Address 10010 | Size 28 bits |

| MAC Stack Pointer Register (MSPR) |
|---|
| Read/Write |

This register contains the physical address of the MAC stack in memory. The pointer points to the beginning of the page containing the stack.

Processor Identification

In a multi-processor system with local memory, the processor has to identify itself to the MAC so that the letter can check whether a local page is in the required local memory. This is done through the Processor Identification register.

| Processor Identification Register (PIR) | |
|---|---|
| Address 10001 | Size 4 bits |
| Read/Write | |

The number encoded in the four bits of this register identifies one of the 16 processors.

| Translate Register | |
|---|---|
| Address 11000 | Size N/A |
| Write only | |

A write to this register will cause the MAC to execute the Translate command.

VERSIONS OF THE MAC

In this specification two versions of the MAC are considered. Only the 32 bit version (SC68920) is described in detail in this paper.

The SC68910 is meant to work with the 68000, 68010 and 68012 processors; it has a 25 bit logical address and a 24 bit physical address space. It will be built in an 84 pin package.

The SC68920 is for the 68020, logical address of 32 bits, physical address is 28 bits. This version will have 120 pins.

The pins indicated with ¢ require an external tri-state buffer since the 680×0 will not make those lines high impedant when the MAC is accessing memory.

| | | | Cumulative Number | | |
|---|---|---|---|---|---|
| Pin/s | Dir | Number | 68910 | 68920 | Description |
| A31-25 | I | 7 | | 7 | High order logical address |
| A24-9 | I | 16 | 16 | 23 | Same as above |
| A8-1 | I/O | 8 | 24 | 31 | As input: within page address or (when CS is low) MAC register address. As output: low order physical address when MAC accesses memory. |
| A0 | I/O | 1 | | 32 | As as A8-1 |
| PA27-24 | O | 4 | | 36 | High order physical address |
| PA23-9 | O | 15 | 39 | 51 | Physical address |
| CADD4-0 | O | 5 | 44 | 56 | High order cache address |
| D31-16 | I/O | 16 | | 72 | Data pins |
| D15-0 | I/O | 16 | 60 | 88 | Data pins |
| FC3-0 ¢ | I | 4 | 64 | 92 | Function Code |
| AS | I | 1 | 65 | 93 | Address strobe issued by processor |
| MAS | O | 1 | 66 | 94 | Memory address strobe to memory issued by MAC |
| UDS ¢ | I/O | 1 | 67 | | Upper data strobe |
| LDS ¢ | I/O | 1 | 68 | | Lower data strobe |
| DS ¢ | I/O | 1 | | 95 | Data strobe |
| SIZEIN | I | 2 | | 97 | SIZE signals from the 68020 |
| SIZEOUT | O | 2 | | 99 | SIZE signals to the bus |
| DSACKIN | I | 2 | | 101 | DSACK signals from 68020 |
| DSACKOUT | O | 2 | | 103 | DSACK signals to the bus |
| DTACKIN | I | 1 | 69 | | Data Acknowledge input from memory |
| DTACKOUT | O | 1 | 70 | | Data Acknowledge output to processor |
| R/WN ¢ | I/O | 1 | 71 | 104 | Read/Write signal |
| CS | I | 1 | 72 | 105 | Chip select |
| CCEN | O | 1 | 73 | 106 | Cache chip enable |
| CWEN | O | 1 | 74 | 107 | Cache write enable |
| LOCAL | O | 1 | 75 | 108 | Local memory enable |

| Pin/s | Dir | Number | Cumulative Number 68910 | Cumulative Number 68920 | Description |
|---|---|---|---|---|---|
| BERRIN | I | 1 | 76 | 109 | Bus error signal, input from bus |
| BERROUT | O | 1 | 77 | 110 | Bus error signal, output to processor |
| HALT | O | 1 | 78 | 111 | Halt signal to processor |
| CLOCK | I | 1 | 79 | 112 | Clock input |
| BR | I | 1 | 80 | 113 | Bus Request for local bus |
| BG | O | 1 | 81 | 114 | Bus Grant for local bus |
| RESET | I | 1 | 82 | 115 | Reset signal, when asserted this signal will reset the MAC |
| VDD/GND | | 2 | 84 | 117 | |

PROGRAMMING THE MAC

This section summarizes in a different order and context the information given in the previous sections.

The Reset Condition

On power-up all the registers on the MAC are reset to zero. This implies that there are no caches attached and all addresses are real; i.e. the MAC does no translation whatsoever. The MAC will also be reset by the RESET signal.

Initializing the System

In order to initialize the system the following registers have to be set:
1. The Page Definition Register;
2. The Size of Segment Register;
3. The Region Definition Register;
4. The Segment Table Pointer Registers;
5. The Segment Table Length Registers;
6. The Region Enable Registers;
7. The MAC Stack Pointer Register;
8. The Size of Cache Register;
9. The MAC Mode Register;

The order of setting is irrelevant except that the MAC Mode Register should be set last because it activates the system.

Programming on a Process Change

As the MAC needs only to be given a process context, it does not have to be reloaded on a process change. The only actions necessary are to define the new context. This is done by loading the relevant region pointer registers i.e. STPRn and STLRn. This action not only defines the new context but invalidates the cache and descriptor cache so as not to confuse the old context with the new context.

Programming for Change of System State

This is similar to the process change. The only difference is the registers to be set, either STPR and STLR registers or by enabling a region (RER).

If the former is done, great care should be taken when this is done. In particular, if there are multiple units accessing memory, i.e. processors or I/O units, they should be in a known state before this is done and should be suitably informed when the system state has changed. In other words, it is assumed that the system is normally only the kernel of the operating system and is normally fixed in memory.

This possibility for reconfiguration is only provided for safety and to allow the system to be reconfigured on a module failure.

Programming for I/O

There are two philosophies which are possible:
1. Real I/O
2. Virtual I/O

Real I/O

In this system all I/O is done in real address space and the MAC is not involved with the I/O operation at all.

Virtual I/O

In this system I/O is mapped through one or more MACs. If MACs are shared between DMA control units, then seven function codes 1xxx should be shared out, one to each of up to seven peripherals. Note that FC 1000 is reserved for the processor and can not be used for I/O devices. The required descriptors need not be in the MAC; however, if there is not a deep FIFO on the peripheral controller then the required tables and pages should be locked into memory.

As there may be a delay in acquiring the required mapping information no peripheral controller should assume that it can get a bus access in less than 10 microseconds for the first word of a page.

TIMING

Signal Timing

Figure 11:
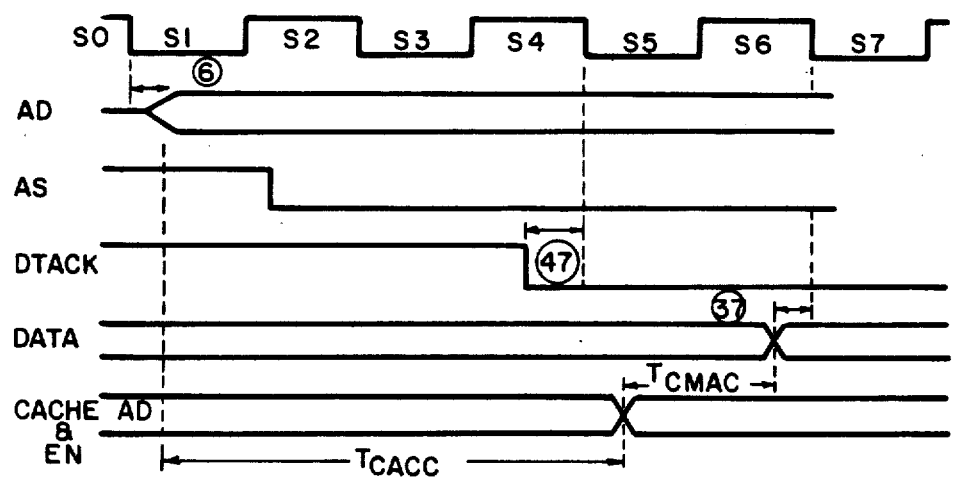
FIG. 11 is a timing chart for a cache hit.

FIG. 11 shows the timing on a cache read hit.

In order to meet the demands on the MAC the following values need to be met:

$$T_{cacc} = 3 \times t_{cy} - (6) - (27) - T_{cmac}$$

where $T_{cmac} = 35$ ns.
Timing for DTACK is as follows:

$$T_{dtack} = 2 \times t_{cy} - (6) - (47)$$

The numbers between brackets refer to timing numbers in the 680x0 specification. The MAC will be designed to work with a 16 MHz 680x0 and will allow it to run with no wait states on a cache read hit.

Timing for MAC Memory Accesses

Memory accesses initiated by the MAC use the same timing as the 68000, i.e. 3 cycles for read and 4 for write. The internal timing of the MAC is such that when a series of reads have to be done, assuming zero wait states from the memory, then a read will be issued every four clock cycles.

Cache Enable

The CWEN signal will have a positive set-up and hold time with respect to CCEN.

Virtual Address Translation

Figure 13:
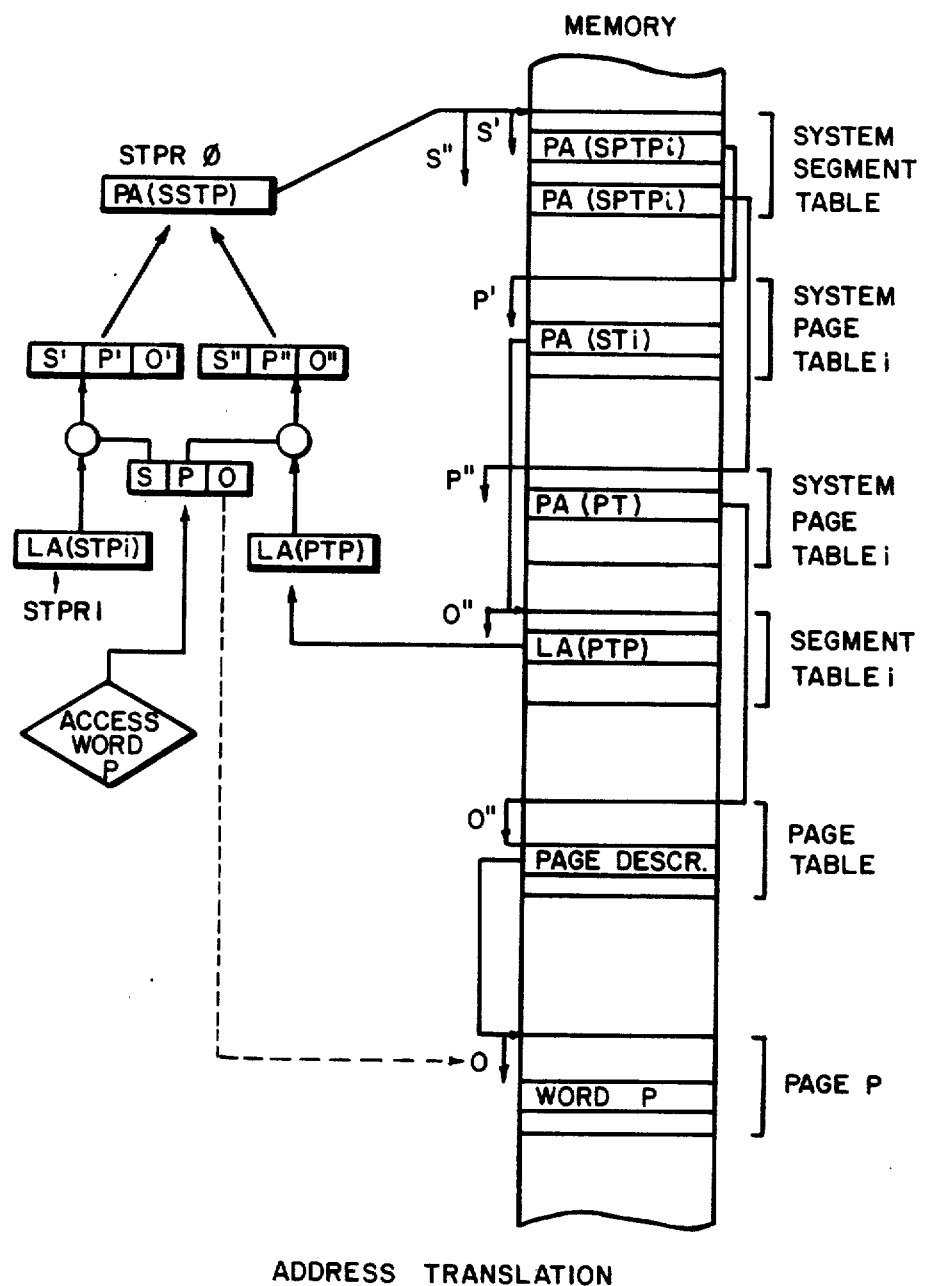
FIG. 13 is a schematic illustration of address translation in the memory access controller.
Figure 14:
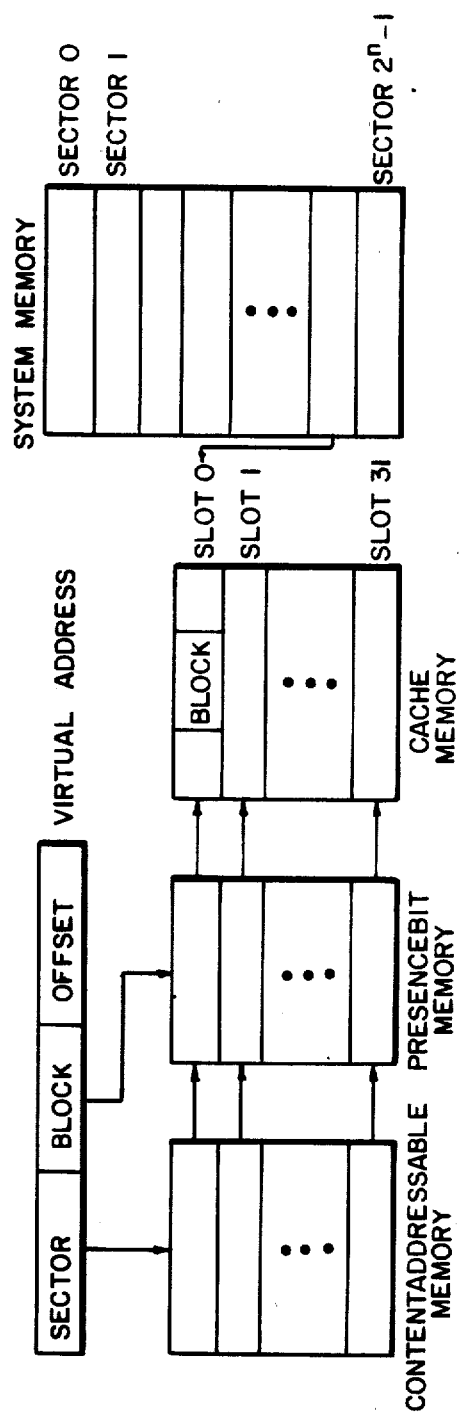
FIGS. 14, 15, 16, 17 and 18 show various aspects of address translation.
Figure 15:
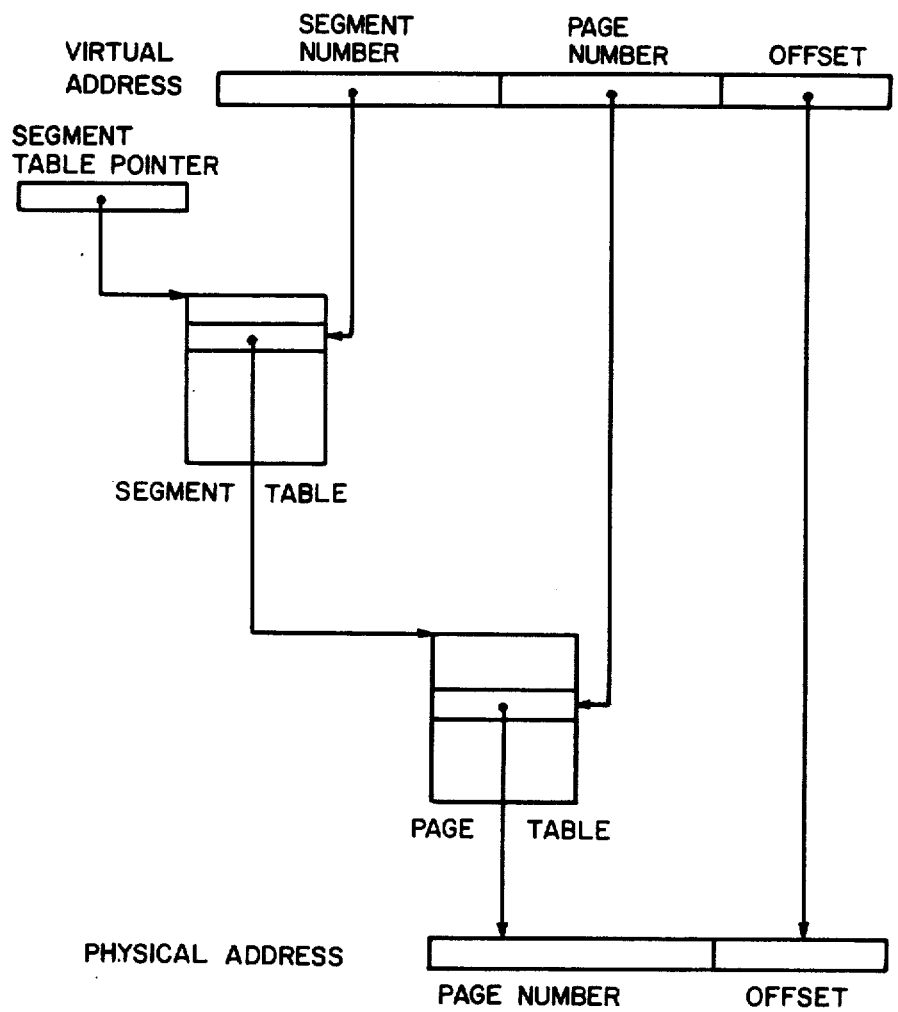
Figure 16:
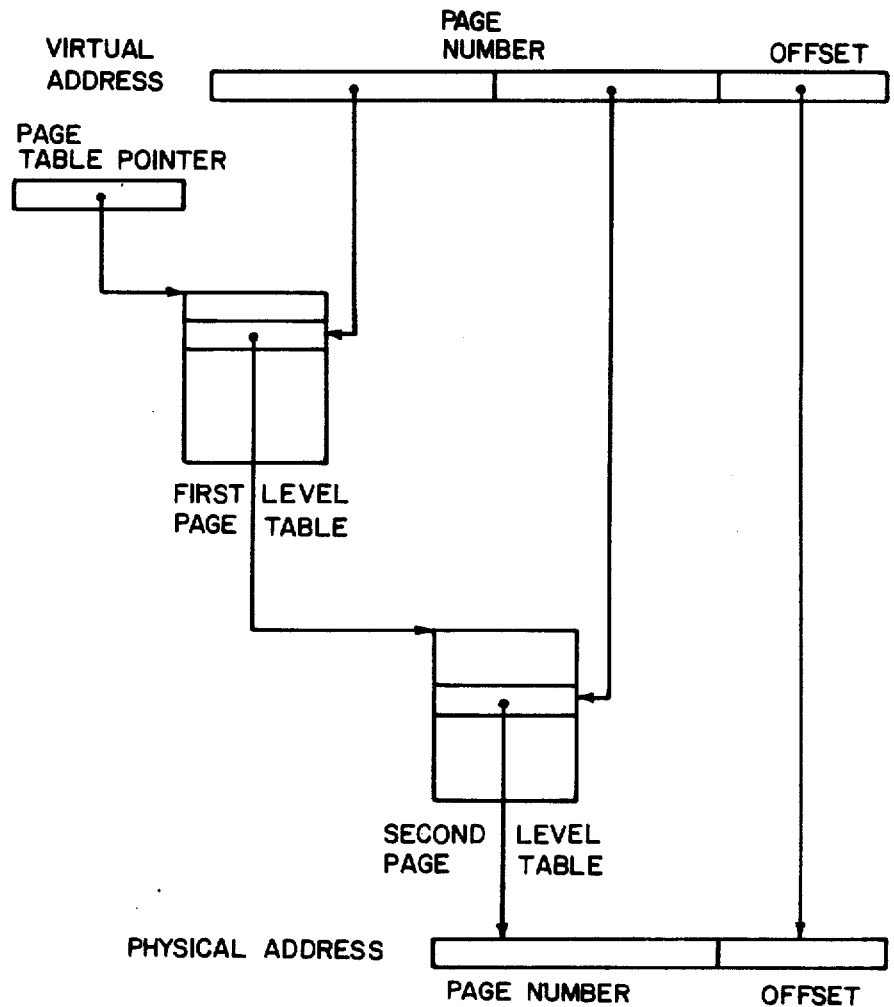
Figure 17:
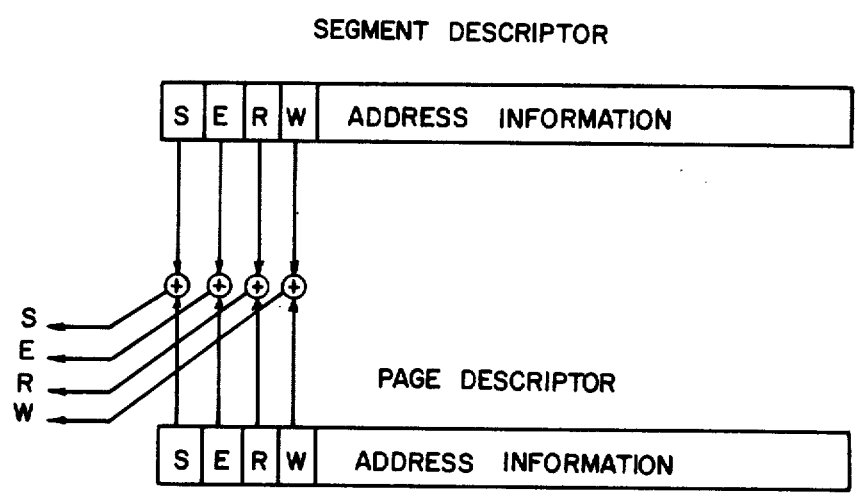
Figure 18:
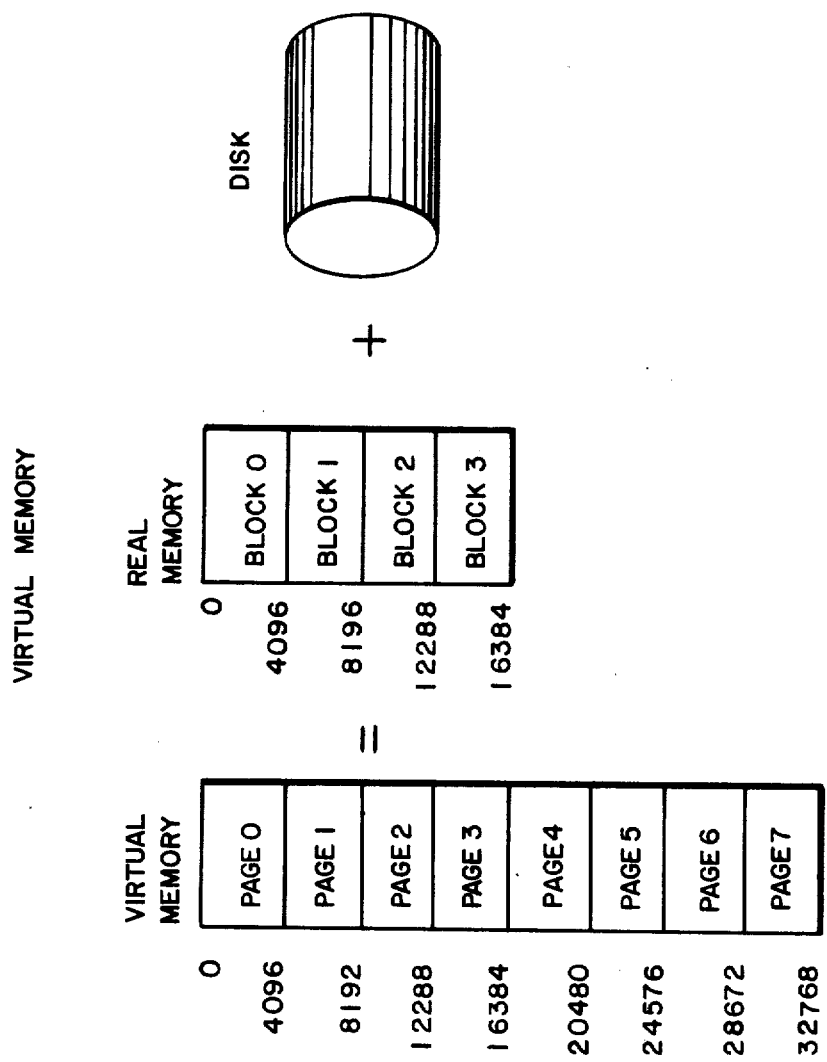

In a virtual memory system the MAC provides the translation from virtual (logical) to real (physical) addresses, using the appropriate segment and page tables, as illustrated in FIG. 13.

A segment consists of several pages and has its own page table. The address of a segment's page table is found in the segment table. A logical address consists of three components:

| segment number | page number | offset within a page |
|---|---|---|
| S | P | O |

Given the address of the segment table, the address translation is typically:
 (1) Use S to index the segment table; there the pointer to the segment's page is found.
 (2) Use P to index the page table; this yields the page address.
 (3) Add the offset O to the page address to obtain the required physical address.

The MAC supports partitioning of the logical address space into four user configurable regions, each region having its own segment table. This arrangement allows a coarse gain of protection (the user must have access to a given region) and a straightforward way to share segments (users having access to a shared region).

The MAC is quite flexible in the range of virtual memory systems that it can support. Some systems may have a large number of large sized segment and page tables. In such systems the tables for user (task) regions may reside in virtual memory, in which case address translation for the table pointers needs to be done in order to access those tables. All table pointers should belong to a region where the translation tables themselves are in physical memory. This is necessary because otherwise these tables could not be accessed and no address translation could be done.

So we can distinguish so-called system regions in which all tables reside in physical memory, from task regions where the segment and page tables are in virtual memory.

FIG. 13 shows the process of accessing memory word p in task region 1 (which has its segment and page tables in virtual memory), in a system that has region O as the system region. It is assumed that the virtual tables are already swapped into main memory but the page descriptors are not available in the MMU-cache. The flow of events is described below.
 1. Region 1's virtual Segment Table Pointer is offset by the Segment number part of the address of word p.
 2. The virtual address that results is translated to a physical address, using the System Tables.
 3. The Segment Table in main memory is accessed, yielding the virtual Page Table Pointer.
 4. This PTP is offset by the page number part of the address of word p.
 5. The resulting virtual address is translated, again using the System Tables in memory.
 6. The Page Table in memory is accessed where the page descriptor for the page containing word p is found. This page descriptor contains the physical address of the page frames.
 7. Word p in memory is accessed using the page frame pointer offset by the offset portion of the address of word p as the physical address.

In the 16 bit version, each segment table entry requires four memory accesses; each page table entry requires two, as does the fetching of each pointer. So the process described above requires a total of 23 memory accesses. Some more memory accesses may be necessary in order to update used and dirty bits in the page tables in memory. If the page descriptors for the segment and/or page tables are already available in the MMU-cache, the total number of memory accesses needed for an address translation decreases, as shown (for the 16 bit MAC) in the table below.

|  | page descr. in MMU cache | | | number of accesses | | | | total memory accesses |
|---|---|---|---|---|---|---|---|---|
|  | ST | PT | p | ST | PT | Pointer | p |  |
| tables in real mem. | n/a | n/a | y | 0 | 0 | 0 | 1 | 1 |
|  | n/a | n/a | n | 1 | 1 | 0 | 1 | 7 |
| tables in virtual mem. | x | x | y | 0 | 0 | 0 | 1 | 1 |
|  | y | y | n | 1 | 1 | 2 | 1 | 11 |
|  | y | n | n | 2 | 2 | 2 | 1 | 17 |
|  | n | y | n | 2 | 2 | 2 | 1 | 17 |
|  | n | n | n | 3 | 3 | 2 | 1 | 23 |

Address Formats and Memory Organization

The following table summarizes the address and data path widths for the two versions of the MAC.

| version | number of bits | | |
|---|---|---|---|
|  | Logical Addr. | Physical Addr. | Data |
| 84 pin | 25 | 24* | 16 |
| 120 pin | 32 | 28 | 32 |

*if no local memories are used, the Physical Address may consist of 25 bits.

The Logical Address is composed of three fields: segment number, page number and offset within the page. The sizes of these fields are programmable in the MAC via the Size of Segment Register (SSR) and the Page Definition Register (PDR). The possible address compositions are shown below.

| 32 Bit Logical Address | | | | |
|---|---|---|---|---|
| bit 31 | 17 16 | 12 11 | 9 8 | 0 |
| s/p --- s/p | p---p | p/o - p/o | o---o | | s/p: bit is part of segment or page number, as defined by SSR.
p: bit is part of page number
p/o: bit is part of page number or offset within page, as defined by PDR.
o: bit is part of the offset within a page.

The table below shows all possible memory organizations:

| Segment size (bytes) | Number of segments | Number of pages per segment | | | |
|---|---|---|---|---|---|
| | | page size 512 bytes | page size 1K bytes | page size 2K bytes | page size 4K bytes |
| 4 G | 1 | 8 M | 4 M | 2 M | 1 M |
| 2 G | 2 | 4 M | 2 M | 1 M | 512 K |
| 1 G | 4 | 2 M | 1 M | 512 K | 256 K |
| 512 M | 8 | 1 M | 512 K | 256 K | 128 K |
| 256 M | 16 | 512 K | 256 K | 128 K | 64 K |
| 128 M | 32 | 256 K | 128 K | 64 K | 32 K |
| 64 M | 64 | 128 K | 64 K | 32 K | 16 K |
| 32 M | 128 | 64 K | 32 K | 16 K | 8 K |
| 16 M | 256 | 32 K | 16 K | 8 K | 4 K |
| 8 M | 512 | 16 K | 8 K | 4 K | 2 K |
| 4 M | 1 K | 8 K | 4 K | 2 K | 1 K |
| 2 M | 2 K | 4 K | 2 K | 1 K | 512 |
| 1 M | 4 K | 2 K | 1 K | 512 | 256 |
| 512 K | 8 K | 1 K | 512 | 256 | 128 |
| 256 K | 16 K | 512 | 256 | 128 | 64 |
| 128 K | 32 K | 256 | 128 | 64 | 32 |

```
            25 bit Logical Address
   bit 24          12 11     9 8      0
       | s/p ----- s/p | p/o - p/o | o---o |
```

Possible memory organizations:

| Segment size (bytes) | Number of segments | Number of pages per segment | | | |
|---|---|---|---|---|---|
| | | page size 512 bytes | page size 1K bytes | page size 2K bytes | page size 4K bytes |
| 32 M | 1 | 64K | 32K | 16K | 8K |
| 16 M | 2 | 32K | 16K | 8K | 4K |
| 8 M | 4 | 16K | 8K | 4K | 2K |
| 4 M | 8 | 8K | 4K | 2K | 1K |
| 2 M | 16 | 4K | 2K | 1K | 512 |
| 1 M | 32 | 2K | 1K | 512 | 256 |
| 512K | 64 | 1K | 512 | 256 | 128 |
| 256K | 128 | 512 | 256 | 128 | 64 |
| 128K | 256 | 256 | 128 | 64 | 32 |
| 64K | 512 | 128 | 64 | 32 | 16 |
| 32K | 1K | 64 | 32 | 16 | 8 |
| 16K | 2K | 32 | 16 | 8 | 4 |
| 8K | 4K | 16 | 8 | 4 | 2 |
| 4K | 8K | 8 | 4 | 2 | 1 |

I claim:

1. Data processing system comprising a processor connected to a common address bus, a memory hierarchy comprising at least a cache memory and a local memory connected to the common bus, a memory access controller connected to the common bus and via a cache address bus to the cache memory, which memory access controller comprises:

a cache controller which comprises a first storage unit for storing first indicators which indicate data present in the cache memory, a first check unit connected to said first storage unit and having a first address input connected to said processor for receiving virtual addresses supplied by the processor, said first check unit being provided for checking a received virtual address to determine if said virtual address corresponds to one of said first indicators stored in said first storage unit and for generating a first check result signal upon correspondence and a second check result signal upon non-correspondence, said cache controller being further provided with a first enabling unit for enabling the access to the cache memory, which first enabling unit being activated upon receiving the first check result signal;

a translation unit having a second address input for receiving virtual addresses and being provided for translating virtual addresses into physical addresses, said translation unit comprises a second storage unit for storing second indicators which indicate data present in the local memory, a second check unit connected to said second storage unit and to said second address input and being provided for checking a received virtual address to determine if said virtual address corresponds to one of said second indicators stored in said second storage unit and for generating a third check result signal upon correspondence and a fourth check result signal upon non-correspondence, said translation unit being controlled by said second check result signal supplied at a first control input thereof, said translation unit being further provided with a second enabling unit for enabling the access to a local memory, which second enabling unit being activated upon receiving a third check result signal;

said cache controller by means of its first input and the translation unit by means of its second address input being connected in parallel to an address bus which is connected to a virtual address output of the processor, which address bus being provided for transporting the virtual addresses simultaneously to said cache controller and said translation unit.

2. Data processing system as claimed in claim 1, characterized in that said memory access controller comprises a microcontroller which comprises a bus access signal generator connected to said second check unit and being provided for generating upon receiving a fourth check result signal a bus access signal in order to acquire access to said common bus, said bus access signal generator being connected to said processor.

3. Data processing system as claimed in claim 2, characterized in that said memory hierarchy further comprises a main memory, and wherein said microcontroller comprises a second control input for receiving a bus access right generated by said processor upon reception of a bus access signal, said microcontroller further comprises a mapping unit connected to said address bus and provided for translating virtual addresses into map-addresses for addressing said main memory, said microcontroller also comprises third enabling means for generating an enable signal in order to access to said main memory.

4. Data processing system as claimed in claim 3, characterized in that said translation unit being provided with first loading means, having a third control input for receiving said enable signal and being provided for loading data fetched from said main memory into said local memory under control of said enable signal, and for loading a second indicator into said second storage unit which indicates the data loaded into said local memory.

5. Data processing system as claimed in any one of claims 1 to 4, characterized in that said first check unit and said first storage unit being formed by a content addressable memory which is connected to said address bus.

6. Data processing system as claimed in any one of claims 1 to 4, characterized in that said second check unit and said second storage unit being formed by a content addressable memory which is connected to said address bus.

7. Data processing system as claimed in any one of claims 1 to 4, characterized in that said memory hierarchy further comprises a main memory, said main memory being partitioned into a first number of sectors and said cache memory being partitioned into a second number of sectors, said virtual address comprising a first field indicating a sector number of a sector in said cache memory, said first checking unit being provided for fetching said first field out of said virtual address and for realizing said checking upon the content of said first field.

8. Data processing system as claimed in claim 7, characterized in that said sectors of said main memory and said cache memory being partitioned into a third and a fourth number of blocks respectively, said virtual address comprising a second field indicating a block number of a block in said cache memory, said first storage unit comprises a presence bit memory for the storage of presence bits indicating which blocks are present in said cache memory, said first checking unit being provided for fetching said second field out of said virtual address and for realizing said checking by controlling if said presence bit of a block number indicated in said field is set in said presence bit memory.

9. Data processing system as claimed in claim 8, wherein said cache controller being provided with second loading means for loading data from said main memory into said cache memory, characterized in that said second loading means being provided for loading said data block-wise into said cache memory and for setting a presence bit for a loaded block into said presence bit memory.

10. Data processing system as claimed in any of claims 1 to 4, characterized in that said memory access controller comprises register means connected to said address bus for partitioning a virtual address space occupied by virtual addresses into a number of different regions and for providing a region number to each region obtained, said register means having a set input for enabling a programmable length of said regions to be partitioned, said register means being provided for realizing said partitioning upon the addressed bits of virtual addresses.

11. Data processing system as claimed in any of the claim 1 to 4, characterized in that said local memory being partitionable into a variable number of segments, each of said segments being partitionable into fixed length pages, said virtual address comprising a segment number for indicating the number of a segment and a page number field for indicating the number of a page within a segment indicated by said segment number field, said memory access controller further comprising a segment table pointer register for storing descriptors of said segments present in said local memory, each of said descriptors comprising a segment table pointer for indicating a segment table of said local memory.

12. Data processing system as claimed in claim 11, characterized in that said segments having a variable length.

13. Data processing system as claimed in claim 11, characterized in that each region comprises at least one segment.

14. Data processing system as claimed in claim 13, characterized in that said register means comprises for each region partitioned a register pair, said register pair comprises a segment table pointer register for storing references about the areas of the virtual address space accessible to a current process, and a segment table length register for indicating the length of the segment.

15. Data processing system as claimed in claim 14, characterized in that said mapping unit has a first input connected to said register means for receiving region numbers and a second input connected to said segment table pointer register for receiving segment table pointer indications indicating a segment table for said region number in said local memory, said mapping unit being provided for generating a physical address by using a segment number field of a virtual address as an index for indicating a position in said segment table and by using a page number field as an index for indicating a position in a page table register indicated by an indexed position in said segment table.

16. Data processing system as claimed in claim 11, characterized in that said descriptors comprise a protection field for indicating whether or not access to the segment indexed by the descriptor is protected.

17. Data processing system as claimed in claim 14, characterized in that said segment table pointer register comprises a location for storing a protection indication in order to indicate whether or not access to the indexed region is protected.

18. Data processing system as claimed in claim 16, characterized in that said descriptors comprise a noncacheable bit for prohibiting, if set, that a segment is loaded into said cache memory.

19. Data processing system as claimed in claim 16, characterized in that said descriptor comprises a local bit for forcing, if set, that a segment be loaded in said local memory.

20. Data processing system as claimed in claim 16, characterized in that said page table comprises a dirty bit for indicating that said pages have been read and/or written into said cache memory and/or local memory.

21. Data processing system as claimed in any one of claims 1 to 4, characterized in that said memory access controller is connected to an I/O unit by means of said address bus, said memory access controller comprises a further mapping unit for mapping a received virtual address into a physical address for said I/O unit.

22. A memory access controller to be used in a data processing system as claimed in any one of the preceding claims 1 to 4, characterized in that said memory access controller comprises a cache controller, a translation unit and a microcontroller.

* * * * *